(12) United States Patent
Sato

(10) Patent No.: US 12,437,928 B2
(45) Date of Patent: Oct. 7, 2025

(54) MULTILAYER CERAMIC ELECTRONIC COMPONENT AND METHOD FOR MANUFACTURING MULTILAYER CERAMIC ELECTRONIC COMPONENT

(71) Applicant: KYOCERA Corporation, Kyoto (JP)

(72) Inventor: Hisashi Sato, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 91 days.

(21) Appl. No.: 18/567,481

(22) PCT Filed: Jun. 7, 2022

(86) PCT No.: PCT/JP2022/023004
§ 371 (c)(1),
(2) Date: Dec. 6, 2023

(87) PCT Pub. No.: WO2022/270299
PCT Pub. Date: Dec. 29, 2022

(65) Prior Publication Data
US 2024/0274359 A1    Aug. 15, 2024

(30) Foreign Application Priority Data

Jun. 23, 2021  (JP) ................................. 2021-104419

(51) Int. Cl.
*H01G 4/30*     (2006.01)
*H01G 4/224*    (2006.01)
(Continued)

(52) U.S. Cl.
CPC .......... *H01G 4/224* (2013.01); *H01G 4/2325* (2013.01); *H01G 4/248* (2013.01); *H01G 4/30* (2013.01)

(58) Field of Classification Search
CPC ...... H01G 4/224; H01G 4/2325; H01G 4/248; H01G 4/30; H01G 4/12; H01G 4/1227;
(Continued)

(56) References Cited

U.S. PATENT DOCUMENTS 9,049,798 B2 * 6/2015 Kim ........................ H01G 4/385
11,417,469 B2 * 8/2022 Nishimura ............. H01G 2/065
(Continued)

FOREIGN PATENT DOCUMENTS

JP    2013058558 A  *  3/2013 ............. H01C 1/148
JP    2017-118083 A     6/2017
(Continued)

*Primary Examiner* — Dion R. Ferguson
(74) *Attorney, Agent, or Firm* — Volpe Koenig

(57) ABSTRACT

A multilayer ceramic electronic component includes a base component, a first external electrode, a second external electrode, and a protective layer. The base component includes ceramic layers and internal electrode layers alternately stacked on one another and includes a first surface, a second surface, a first end face, a second end face, a first side surface, and a second side surface. The internal electrode layers are exposed on the first and second side surfaces and on the first or second end face. Each of the first and second external electrodes extends to at least one of the first or second surface from the first or second end face and includes first and second terminal side surfaces. The protective layer contains a ceramic material and covers the first and second side surfaces, and the first and second terminal side surfaces of each of the first and second external electrodes.

12 Claims, 18 Drawing Sheets

(51) Int. Cl.
*H01G 4/232* (2006.01)
*H01G 4/248* (2006.01)

(58) Field of Classification Search
CPC . H01G 4/232; H01C 7/02; H01C 7/04; H01C 7/10; H01F 17/00
See application file for complete search history.

(56) References Cited

U.S. PATENT DOCUMENTS

| | | | |
|---|---|---|---|
| 2013/0057112 A1* | 3/2013 | Shirakawa | H01G 4/12 336/200 |
| 2016/0293332 A1 | 10/2016 | Kato et al. | |
| 2019/0385795 A1* | 12/2019 | Yang | H01G 4/30 |
| 2021/0233713 A1* | 7/2021 | Nishimura | H01G 4/1218 |
| 2024/0274359 A1* | 8/2024 | Sato | H01G 4/232 |

FOREIGN PATENT DOCUMENTS

| | | | |
|---|---|---|---|
| KR | 101376921 B1 * | 3/2014 | |
| KR | 20140128099 A * | 11/2014 | |
| KR | 20150005045 A * | 1/2015 | |

* cited by examiner

MULTILAYER CERAMIC ELECTRONIC COMPONENT AND METHOD FOR MANUFACTURING MULTILAYER CERAMIC ELECTRONIC COMPONENT

TECHNICAL FIELD

The present disclosure relates to a multilayer ceramic electronic component and a method for manufacturing the multilayer ceramic electronic component.

BACKGROUND OF INVENTION

A known technique is described in, for example, Patent Literature 1.

CITATION LIST

Patent Literature

Patent Literature 1: Japanese Unexamined Patent Application Publication No. 2017-118083

SUMMARY

In one or more aspects of the present disclosure, a multilayer ceramic electronic component includes a base component being substantially a rectangular prism, a first external electrode, a second external electrode, and a protective layer. The base component includes a plurality of ceramic layers and a plurality of internal electrode layers with different polarities alternately stacked on one another. The base component includes a first surface and a second surface opposite to each other in a stacking direction of the plurality of ceramic layers and the plurality of internal electrode layers, a first end face and a second end face opposite to each other, and a first side surface and a second side surface opposite to each other. The plurality of internal electrode layers is exposed on the first side surface and on the second side surface. The plurality of internal electrode layers includes internal electrode layers with a first polarity exposed on one of the first end face or the second end face and internal electrode layers with a second polarity exposed on the other of the first end face or the second end face. The first external electrode is connected to the internal electrode layers exposed on the first end face. The second external electrode is connected to the internal electrode layers exposed on the second end face. Each of the first external electrode and the second external electrode extends to at least one of the first surface or the second surface and includes a first terminal side surface flush with the first side surface and a second terminal side surface flush with the second side surface. The protective layer contains a ceramic material. The protective layer covers the first side surface, the second side surface, and the first terminal side surface and the second terminal side surface of each of the first external electrode and the second external electrode.

In one or more aspects of the present disclosure, a method for manufacturing a multilayer ceramic electronic component includes cutting a multilayer base into a first rod at a predetermined interval. The multilayer base includes a plurality of ceramic green sheets and a plurality of internal electrode layers alternately stacked on one another. The first rod includes a first surface, a second surface, a first cut surface, and a second cut surface. The method includes chamfering edges between the first and second surfaces and the first and second cut surfaces and forming a first external electrode and a second external electrode extending from each of the first cut surface and the second cut surface to at least one of the first surface or the second surface to obtain a second rod. The method includes cutting the second rod at a predetermined interval in a direction orthogonal to a longitudinal direction of the second rod to form a third cut surface and a fourth cut surface on which the plurality of internal electrode layers is exposed and forming a protective layer containing a ceramic material on each of the third cut surface and the fourth cut surface.

DESCRIPTION OF EMBODIMENTS

The objects, features, and advantages of the present disclosure will become more apparent from the following detailed description and the drawings.

Recent electronic components with higher functions are densely mounted on circuit boards for electronic devices. Examples of such electronic components include multilayer ceramic electronic components, or more specifically, multilayer ceramic capacitors.

Patent Literature 1 describes a technique for increasing the area percentage of internal electrodes by reducing the thickness of a side margin for protecting internal electrodes to increase the capacitance achievable per unit volume, as intended for a multilayer ceramic capacitor, and for reducing a leakage current between the external electrodes and the internal electrodes when the side margin is thin by eliminating external electrodes on the side surfaces of a base included in the multilayer ceramic capacitor.

The multilayer ceramic capacitor in Patent Literature 1 includes the external electrodes exposed on its side surfaces. When such multilayer ceramic capacitors are densely mounted on a circuit board, the external electrodes of adjacent multilayer ceramic capacitors may be short-circuited.

A multilayer ceramic electronic component and a method for manufacturing the multilayer ceramic component according to one or more embodiments of the present disclosure will now be described with reference to the drawings. In the example described below, the multilayer ceramic electronic component is a multilayer ceramic capacitor. In one or more embodiments of the present disclosure, the method for manufacturing the multilayer ceramic capacitor allows manufacture of, in addition to the multilayer ceramic capacitor, various multilayer ceramic electronic components, such as multilayer piezoelectric elements, multilayer thermistor elements, multilayer chip coils, and multilayer ceramic substrates. The figures referred to below are schematic except the photograph in FIG. 4, and are not drawn to scale relative to, for example, the actual positions and the dimensional ratios of the parts of the multilayer ceramic component.

Figure 1:
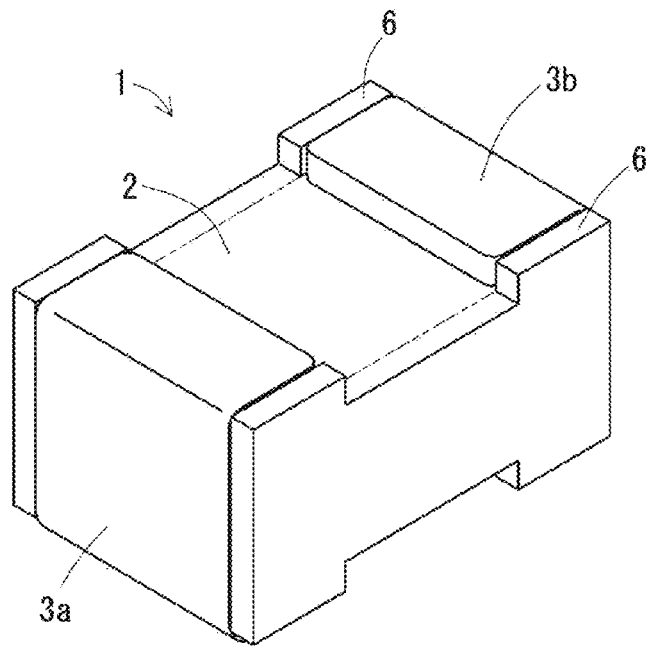
FIG. 1 is a perspective view of an example multilayer ceramic electronic component according to an embodiment of the present disclosure.
Figure 2:
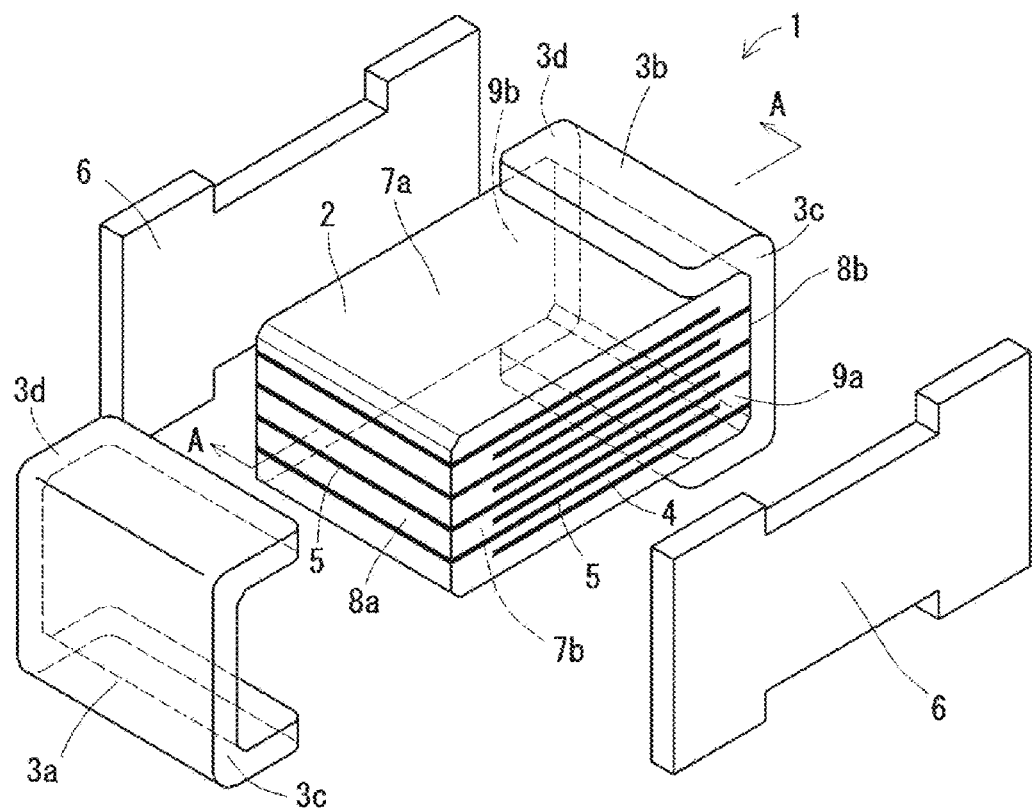
FIG. 2 is an exploded perspective view of the multilayer ceramic electronic component in FIG. 1.
Figure 3:
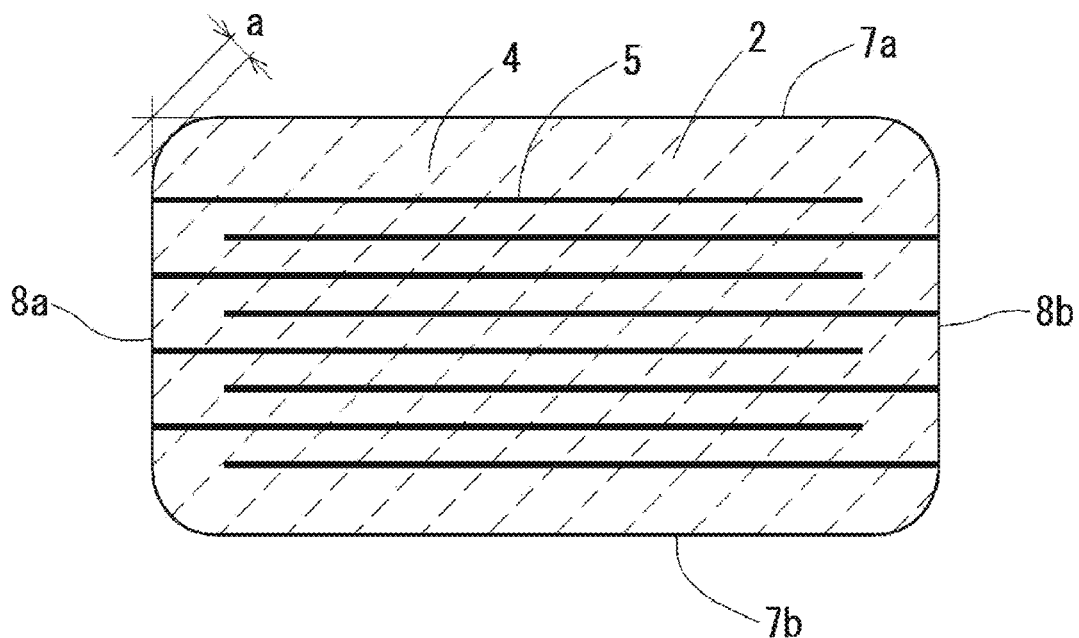
FIG. 3 is a cross-sectional view of a base component of the multilayer ceramic electronic component taken along line A-A in FIG. 2.
Figure 4:
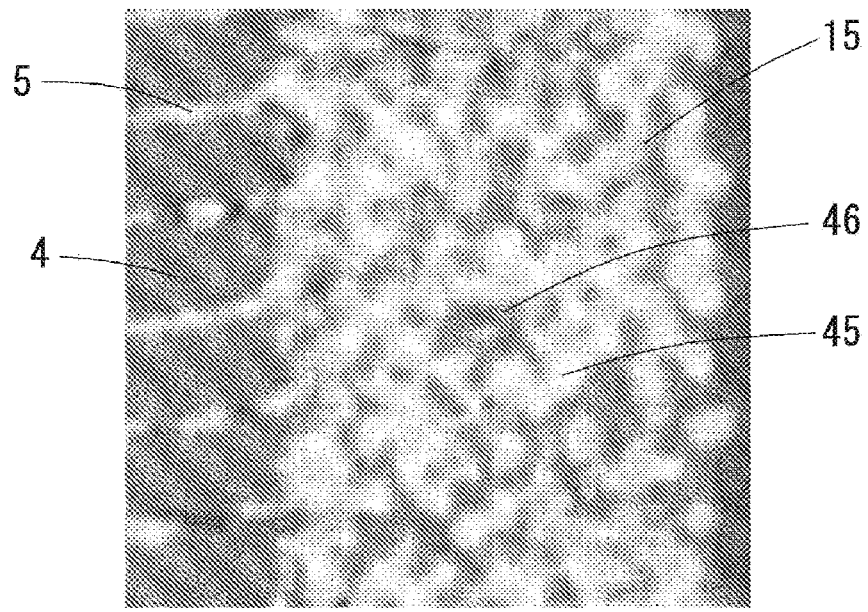
FIG. 4 is a photograph of a part of the multilayer ceramic electronic component in a cross section taken along line A-A in FIG. 2.
Figure 5A:
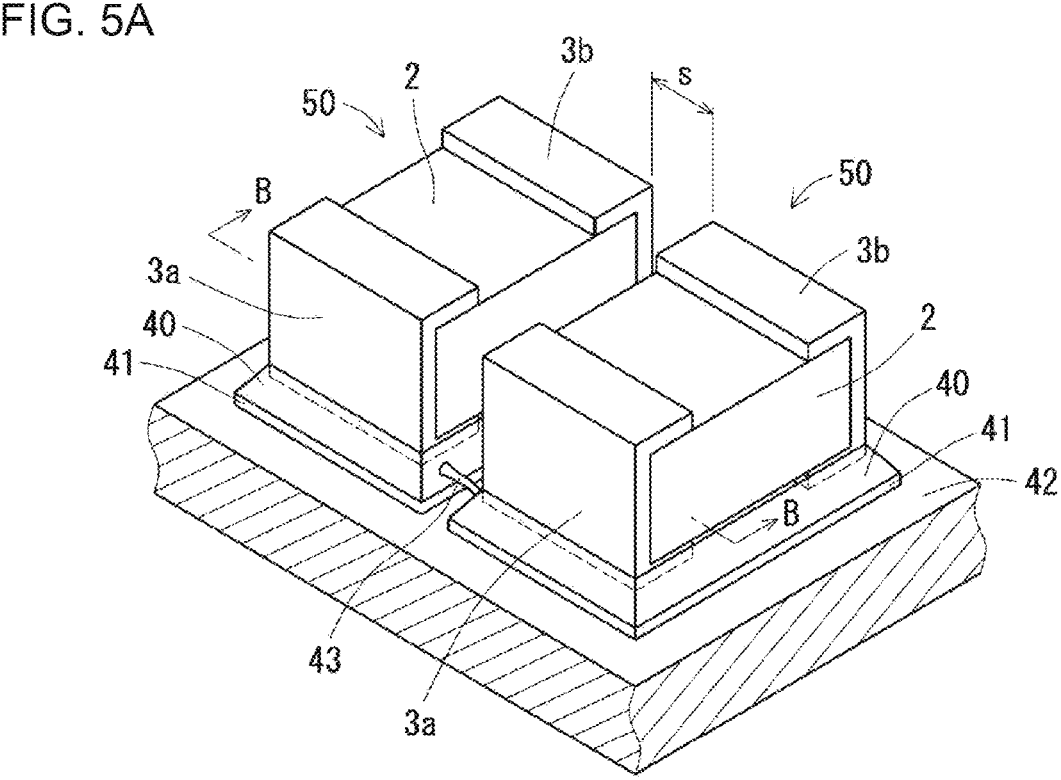
FIG. 5A is a perspective view of known multiple multilayer ceramic electronic components mounted on a mounting board.
Figure 5B:
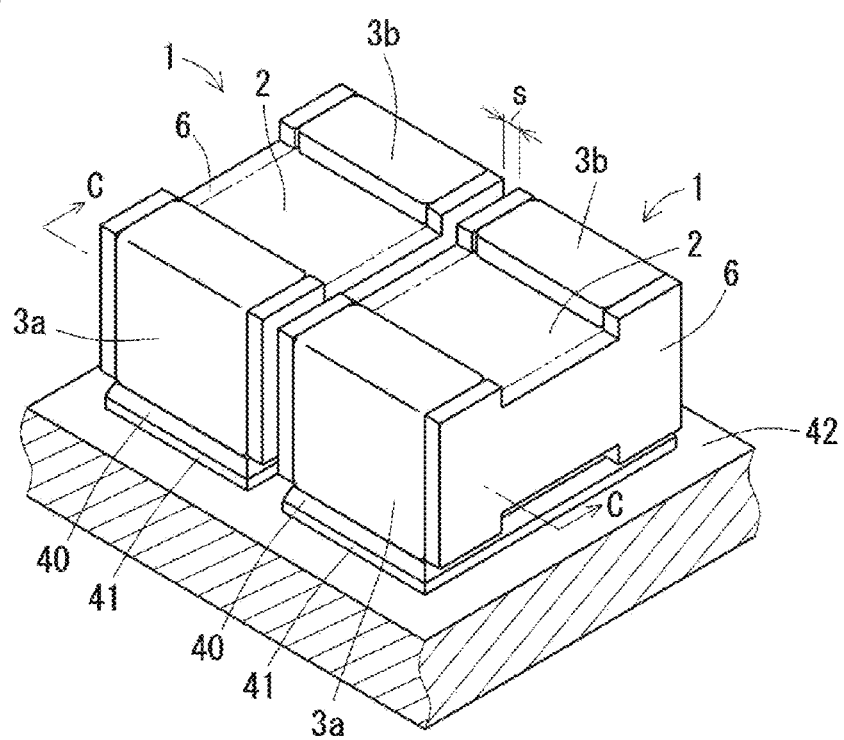
FIG. 5B is a perspective view of multiple multilayer ceramic electronic components illustrated in FIG. 1 mounted on a mounting board.
Figure 6A:
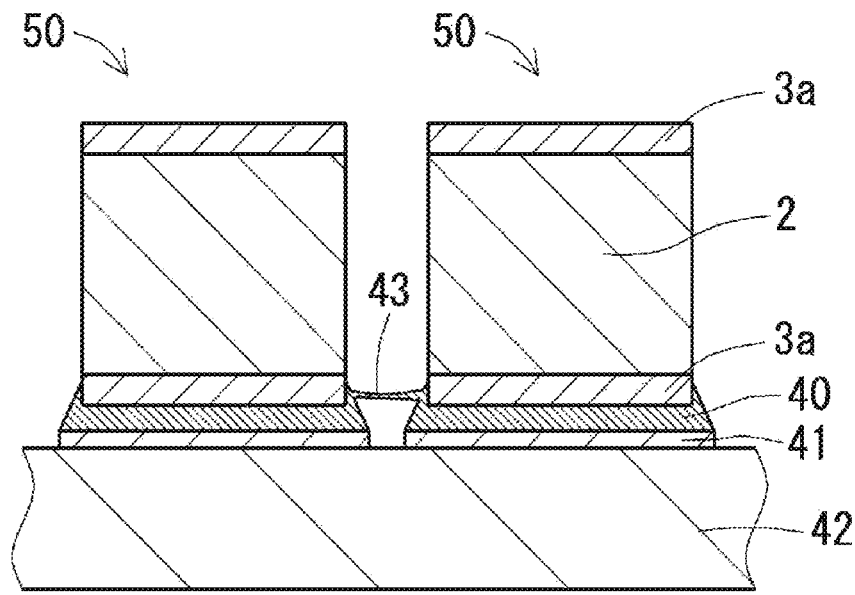
FIG. 6A is a cross-sectional view taken along line B-B in FIG. 5A.
Figure 6B:
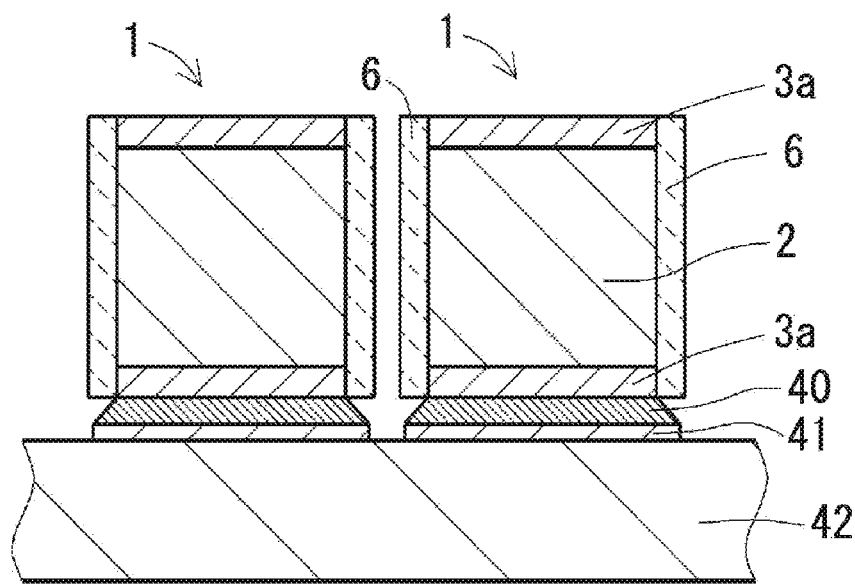
FIG. 6B is a cross-sectional view taken along line C-C in FIG. 5B.

FIG. 1 is a perspective view of an example multilayer ceramic electronic component according to one embodiment of the present disclosure. FIG. 2 is an exploded perspective view of the multilayer ceramic electronic component in FIG. 1. An actual multilayer ceramic electronic component includes its parts sintered and tightly bonded to one another and cannot be disassembled as illustrated in FIG. 2. FIG. 3 is a cross-sectional view of a base component of the multilayer ceramic electronic component taken along line A-A in FIG. 2. FIG. 4 is a photograph of a part of the multilayer ceramic electronic component in a cross section taken along line A-A in FIG. 2. FIG. 4 illustrates a portion of the base component adjacent to its end face and a portion of the external electrodes adjacent to the base component. FIG. 5A is a perspective view of known multiple multilayer ceramic electronic components mounted on a mounting board. FIG. 5B is a perspective view of multiple multilayer ceramic electronic components in FIG. 1 mounted on a mounting board. FIG. 6A is a cross-sectional view taken along line B-B in FIG. 5A. FIG. 6B is a cross-sectional view taken along line C-C in FIG. 5B.

As illustrated in, for example, FIG. 1, a multilayer ceramic electronic component 1 according to the present embodiment includes a base component 2, a first external electrode 3a, a second external electrode 3b, and protective layers 6. The multilayer ceramic electronic component 1 may be hereafter referred to as a multilayer ceramic capacitor 1.

As illustrated in, for example, FIG. 2, the base component 2 is substantially a rectangular prism. The base component 2 is a stack of multiple dielectric ceramic layers (hereafter also simply referred to as ceramic layers) 4 and multiple internal electrode layers 5 with different polarities alternately stacked on one another. Each ceramic layer 4 is between a pair of internal electrode layers 5 with different polarities. The base component 2 includes a first surface 7a and a second surface 7b opposite to each other in the stacking direction of the ceramic layers 4 and the internal electrode layers 5. The base component 2 includes a first end face 8a and a second end face 8b opposite to each other and a first side surface 9a and a second side surface 9b opposite to each other. The first surface 7a and the second surface 7b may be hereafter collectively referred to as main surfaces 7a and 7b. The first end face 8a and the second end face 8b may also be collectively referred to as end faces 8a and 8b. The first side surface 9a and the second side surface 9b may also be collectively referred to as side surfaces 9a and 9b. The ceramic layers 4 may contain, for example, a ceramic material such as $BaTiO_3$ (barium titanate). The ceramic layers 4 may contain barium titanate as a main component. The internal electrode layers 5 may contain a metal such as Ni (nickel), Pd (palladium), Cu (copper), or Ag (silver), or an alloy of these metals. The internal electrode layers 5 may contain nickel or a nickel alloy as a main component.

The internal electrode layers 5 are exposed on both the first side surface 9a and the second side surface 9b. The internal electrode layers 5 are also exposed on the first end face 8a and the second end face 8b, with internal electrode layers 5 having a first polarity on either the first or second end face 8a or 8b and internal electrode layers 5 having a second polarity on the other end face. In other words, each internal electrode layer 5 is exposed on the first end face 8a or the second end face 8b based on its polarity.

As illustrated in, for example, FIG. 2, the first external electrode 3a is located on one of the first end face 8a or the second end face 8b (on the first end face 8a in the figure) and connected to the internal electrode layers 5 exposed on the end face. As illustrated in, for example, FIG. 2, the second external electrode 3b is located on the other of the first end face 8a or the second end face 8b (on the second end face 8b in the figure) and connected to the internal electrode layers 5 exposed on the end face. The first external electrode 3a extends from the first end face 8a to at least one of the first surface 7a or the second surface 7b. The second external electrode 3b extends from the second end face 8b to at least one of the first surface 7a or the second surface 7b. Each of the first external electrode 3a and the second external electrode 3b extends on at least one of the main surfaces 7a and 7b by a predetermined distance in a direction orthogonal to the end faces 8a and 8b. In the example in FIGS. 1 and 2, each of the first external electrode 3a and the second external electrode 3b extends to both the main surfaces 7a and 7b from the corresponding end face 8a or 8b.

Each of the first external electrode 3a and the second external electrode 3b includes a first terminal side surface 3c and a second terminal side surface 3d. The first external electrode 3a includes the first terminal side surface 3c flush with the first side surface 9a of the base component 2 and the second terminal side surface 3d flush with the second side surface 9b of the base component 2. The second external electrode 3b includes the first terminal side surface 3c flush with the first side surface 9a of the base component 2 and the second terminal side surface 3d flush with the second side surface 9b of the base component 2.

The protective layers 6 contain an insulating ceramic material. The protective layers 6 may contain, for example, a ceramic material such as barium titanate. The protective layers 6 may contain barium titanate as a main component. The protective layers 6 cover the side surfaces 9a and 9b of the base component 2, the terminal side surface 3c and the terminal side surface 3d of the first external electrode 3a, and the terminal side surface 3c and the terminal side surface 3d of the second external electrode 3b. In the present embodiment, the first terminal side surface 3c and the second terminal side surface 3d of the first external electrode 3a are flush with the respective first side surface 9a and the second side surface 9b. The first terminal side surface 3c and the second terminal side surface 3d of the second external electrode 3b are flush with the respective first side surface 9a and the second side surface 9b. This facilitates precise simultaneous formation of the protective layers 6 on the base component 2 and the first and the second external electrode 3a and 3b containing different materials.

When the first external electrode 3a extends from the first end face 8a to both the first surface 7a and the second surface 7b and the second external electrode 3b extends from the second end face 8b to both the first surface 7a and the second surface 7b, the protective layers 6 are substantially H-shaped as viewed in a direction orthogonal to the side surfaces 9a and 9b as illustrated in, for example, FIGS. 1 and 2. When the first external electrode 3a extends from the first end face 8a to one of the first surface 7a or the second surface 7b and the second external electrode 3b extends from the second end face 8b to one of the first surface 7a or the second surface 7b, the protective layers 6 are substantially U-shaped as viewed in the direction orthogonal to the side surfaces 9a and 9b. In FIG. 1, the boundaries between the base component 2 and the protective layers 6 are indicated by the two-dot-dash lines for ease of explanation. However, the actual boundaries may appear unclear.

In the present embodiment, the multilayer ceramic capacitor 1 includes the side surfaces 9a and 9b, the terminal side surfaces 3c, and the terminal side surfaces 3d covered with the protective layers 6 containing an insulating ceramic material. This allows multiple multilayer ceramic electronic components 1 to be mounted close to one another on a circuit board with less short-circuiting between the multilayer ceramic electronic components 1. In the present embodiment, the multilayer ceramic capacitors 1 can thus be densely mounted on a circuit board.

The multilayer ceramic capacitor 1 includes a portion referred to as a side margin that extends from the side edges of the internal electrode layers 5 to the side surface of the base component 2. In the present embodiment, the multilayer ceramic electronic component 1 uses the protective layers 6 substantially as the side margins. The protective layers 6 can be thinner (e.g., less than or equal to 30 μm). This increases the area percentage of the internal electrode layers 5 in the multilayer ceramic electronic component 1 to increase the achievable capacitance. The area percentage of the internal electrode layers 5 may be the percentage of the area of overlapping portions of the internal electrode layers 5 to the area of the base component 2 and the protective layers 6 as viewed in plan (as viewed in a direction orthogonal to the main surfaces 7a and 7b). Thinner protective layers 6 increase the area percentage of the internal electrode layers 5. To protect the side surfaces 9a and 9b of the base component 2 and the terminal side surface 3c and the terminal side surface 3d of each of the first external electrode 3a and the second external electrode 3b, the thickness of the protective layers 6 may be 5 to 30 μm inclusive.

Each of the first external electrode 3a and the second external electrode 3b may include an underlayer 15 in contact with the base component 2. As illustrated in, for example, FIG. 3, the base component 2 may include chamfered edges between the main surfaces 7a and 7b and the end faces 8a and 8b. When the edges between the main surfaces 7a and 7b and the end faces 8a and 8b are unchamfered, the underlayers 15 are likely to be thinner at the corners connecting the main surfaces 7a and 7b and the end faces 8a and 8b. Each underlayer 15 may thus be discontinuous and reduce the electrical reliability of the multilayer ceramic capacitor 1. With the chamfered edges between the main surfaces 7a and 7b and the end faces 8a and 8b, the underlayers 15 can be thick enough at the corners connecting the main surfaces 7a and 7b and the end faces 8a and 8b to improve the electrical reliability of the multilayer ceramic capacitor 1. As illustrated in, for example, FIG. 3, the base component 2 may have a chamfer distance a that is greater than or equal to 3 μm. The chamfer distance a herein refers to the shortest distance from an intersection line between the extension surfaces of the main surfaces 7a and 7b and the extension surfaces of the end faces 8a and 8b to the surface of the base component 2.

Each of the first external electrode 3a and the second external electrode 3b may include a plated outer layer 16 on a surface of the underlayer 15 opposite to the surface facing the base component 2. The multilayer ceramic capacitor 1 is mounted on a circuit board 42 by, for example, bonding the external electrodes 3 to an electrode pad 41 on the circuit board 42 with a conductive bonding material such as solder 40 (refer to FIGS. 5B and 6B). The external electrodes 3 including the plated outer layers 16 can have less corrosion and increase the strength of bonding between the multilayer ceramic capacitor 1 and the circuit board 42 with the conductive bonding material.

The underlayers 15 may contain a ceramic material and a conductive metal material. The ceramic material of the underlayers 15 may include a component being the same as or similar to the main component of the ceramic layers 4 or the main component of the protective layers 6. The conductive metal material of the underlayers 15 may include a component being the same as or similar to the main component of the internal electrode layers 5. This improves the bonding strength of the underlayers 15 with the base component 2 and the protective layers 6 and reduces a decrease in the conductivity of the underlayers 15 as described later, thus improving the reliability of the multilayer ceramic capacitor. The component being the same as or similar to the main component will now be described. For ceramics or electrodes, the main component refers to an inorganic material component alone although the ceramics or the electrodes contain inorganic materials and organic materials. When the inorganic material component of the ceramics or the electrodes includes a single component or multiple components, the component with the highest ratio and cumulatively constituting 80% of the total is referred to as the main component. The component being the same as the main component refers to the component with the highest ratio and constituting 80% of the total. The same or similar component for materials including the same main component refers to the component that may have variations in the composition ratio and the particle size.

The underlayers 15 may be obtained by, for example, firing a conductive paste of a mixture of a binder and a raw powder including a dielectric ceramic powder and a conductive metal powder. The conductive paste to be the underlayers 15 may be applied to the base component 2 before firing and may be fired together with the base component 2. The plated outer layers 16 may be formed on the surfaces of the underlayers 15 opposite to the surfaces facing the base component 2 after firing of the base component 2 and the underlayers 15. Each underlayer 15 or each plated outer layer 16 may be single-layered or multilayered. For example, the plated outer layer 16 may include a lower layer of Ni adjacent to the underlayer 15 and a surface layer of Sn. The plated outer layer 16 may be replaced with a conductive resin layer.

FIG. 4 is a photograph of a joint between the end face 8a or 8b of the base component 2 and the underlayer 15 of the first external electrode 3a or the second external electrode 3b. The photograph in FIG. 4 illustrates a cross section of the multilayer ceramic capacitor 1 observed with a scanning electron microscope. As illustrated in, for example, FIG. 4, the underlayer 15 is in a mesh-like matrix including a metallic phase 45 (white areas in FIG. 4) and a ceramic phase 46 (black areas in FIG. 4) in a cross-sectional view. The internal electrode layers 5 in the base component 2 extend to the end faces 8a and 8b and are bonded to the metallic phase 45 of the underlayer 15 by sintering. The dielectric ceramic layers 4 in the base component 2 are bonded to the ceramic phase 46 of the underlayer 15 on the end faces 8a and 8b by sintering. Although not illustrated in the figure, the ceramic phases of the protective layers 6 and the underlayers 15 are also bonded by sintering in the same or similar manner as the ceramic phases of the dielectric ceramic layers 4 and the underlayers 15 illustrated in FIG. 4.

When the ceramic of the base component 2 and the ceramic of the underlayer 15 are bonded by sintering on the end faces 8a and 8b, the ceramic portion of the base component 2 and the amorphous ceramic portion of the underlayers 15 are integrated. This firmly bonds the underlayers 15 to the base component 2. In the same or similar manner, the underlayers 15 and the protective layers 6 are firmly bonded together with the ceramic portions bonded by sintering at the interface.

To achieve firm ceramic bonding by sintering and metal bonding by sintering, the sintering behavior of a ceramic material and a metal material to be bonded by sintering is to be controlled. In the present embodiment, the underlayers 15 are made of a ceramic material and a conductive metal material. The ceramic material of the underlayers 15 may include a component being the same as or similar to the main component of the ceramic layers 4 of the base component 2 or the main component of the protective layers 6. The conductive metal material of the underlayers 15 may include a component being the same as or similar to the main component of the internal electrode layers 5.

The base component 2, the first external electrode 3a and the second external electrode 3b attached to the base component 2, and the protective layers 6 attached to the base component 2 and the first and second external electrodes 3a and 3b may be formed simultaneously by firing. The ceramic particles contained in the base component 2, the first external electrode 3a, the second external electrode 3b, and the protective layers 6 are sintered to one another in the firing process. This firmly attaches these components to one another to provide the multilayer ceramic capacitor 1 with a predetermined function. Ceramic materials containing the same or similar main components have close sintering temperatures. The firing of the ceramic materials is thus started at the same time to bond the ceramic particles to one another.

In firing, the metal particles contained in the internal electrode layers 5 and the metal particles contained in the underlayers 15 are bonded by sintering bonding portions on the end faces 8a and 8b of the base component 2. The metal particles in the internal electrode layers 5 and the metal particles in the underlayers 15 may be the same or similar materials that behave substantially in the same manner during firing.

The ratio between the metallic phase 45 and the ceramic phase 46 in the underlayers 15 may be controlled. The ratio between the metallic phase 45 and the ceramic phase 46 may be, for example, the ratio between the area of the metallic phase 45 and the area of the ceramic phase 46 in a cross section of the underlayers 15. When the ratio of the ceramic phase 46 is higher, the bonding strength of the underlayers 15 with the base component 2 and the protective layers 6 is higher. However, the conductivity of the underlayers 15 is lower. This reduces the bonding area with the internal electrode layers 5 and may electrically disconnect the underlayers 15 from the internal electrode layers 5. When the ratio of the ceramic phase 46 is lower, the internal electrode layers 5 and the metallic phase 45 are bonded with a level of bonding strength on the end faces 8a and 8b of the base component 2. However, the underlayer 15 and the protective layers 6 have a lower level of bonding strength on the terminal side surface 3c and the terminal side surface 3d of the first external electrode 3a and the second external electrode 3b. This may cause the protective layers 6 to peel off from the base component 2, the first external electrode 3a, and the second external electrode 3b. The underlayer 15 may have the ratio of 40:60 to 80:20 between the area of the metallic phase 45 and the area of ceramic phase 46 in a cross-sectional view. Such ratios increase the bonding strength of the underlayers 15 with the base component 2 and the protective layers 6 and reduce a decrease in the conductivity of the underlayers 15. The ratio between the area of the metallic phase 45 and the area of the ceramic phase 46 may be measured by, for example, observing the cross sections of the underlayers 15 with a scanning electron microscope.

When the main component of the ceramic layers 4 is ferroelectric barium titanate and the main component of the internal electrode layers 5 is nickel or a nickel alloy, the underlayers 15 may be made of a ceramic dielectric material containing, as the main component, barium titanate being the same as barium titanate contained in the ceramic layers 4 and a conductive metal material containing, as the main component, nickel or a nickel alloy being the same as nickel or the nickel alloy contained in the internal electrode layers 5. The protective layers 6 may be made of a ceramic material containing, as the main component, barium titanate being the same as barium titanate contained in the ceramic layers 4.

In the present embodiment, the multilayer ceramic electronic component 1 includes the side surfaces 9a and 9b, the terminal side surfaces 3c, and the terminal side surfaces 3d covered with the protective layers 6 containing an insulating ceramic material. This allows multilayer ceramic electronic components 1 to be mounted close to one another on a circuit board with less short-circuiting between the multilayer ceramic electronic components 1. The advantageous effects of the multilayer ceramic capacitor 1 compared with a known multilayer ceramic capacitor will now be described with reference to FIGS. 5A to 6B.

FIG. 5A is a diagram of known multilayer ceramic capacitors 50 without the protective layers 6, densely mounted on the circuit board 42. Multilayer ceramic capacitors adjacent to one another are at a distance s that is set based on, for example, the position of external electrodes of the multilayer ceramic capacitors, mounting precision, and soldering effects. The known multilayer ceramic capacitors 50 adjacent to one another at a small distance s with the first external electrodes 3a and the second external electrodes 3b being in contact or nearly in contact with one another can easily have short-circuiting or insulation degradation.

FIG. 5B is a diagram of the multilayer ceramic capacitors 1 according to the present embodiment, densely mounted on the circuit board 42. In the present embodiment, the multilayer ceramic capacitors 1 each include the terminal side surfaces 3c and the terminal side surfaces 3d of the first external electrode 3a and the second external electrode 3b covered with the protective layers 6, thus effectively reducing contact and short-circuiting between the first external electrodes 3a and the second external electrodes 3b. The adjacent multilayer ceramic capacitors 1 can thus be at a smaller distance s, allowing high-density mounting.

FIG. 6A is a diagram of the known multilayer ceramic capacitors 50 densely mounted on the circuit board 42, with a solder spatter 43 causing short-circuiting between the adjacent multilayer ceramic capacitors 50. In the known multilayer ceramic capacitors 50, the solder 40 covering the surface of the first external electrode 3a or the second external electrode 3b (first external electrode 3a in FIG. 6A) is scattered by a gas generated from the first external electrode 3a or the second external electrode 3b (first external electrode 3a in FIG. 6A) while the solder 40 is melting. The spattering solder 40 bridges the adjacent multilayer ceramic capacitors and causes short-circuiting. In the present embodiment, as illustrated in, for example, FIG. 6B, the multilayer ceramic capacitor 1 includes the protective layers 6 covering the terminal side surfaces 3c and the terminal side surfaces 3d of the first external electrode 3a and the second external electrode 3b. This structure reduces short-circuiting between the multilayer ceramic capacitors 1 adjacent to each other caused by the solder spatter 43.

A multilayer ceramic electronic component according to another embodiment of the present disclosure will now be described.

Figure 7:
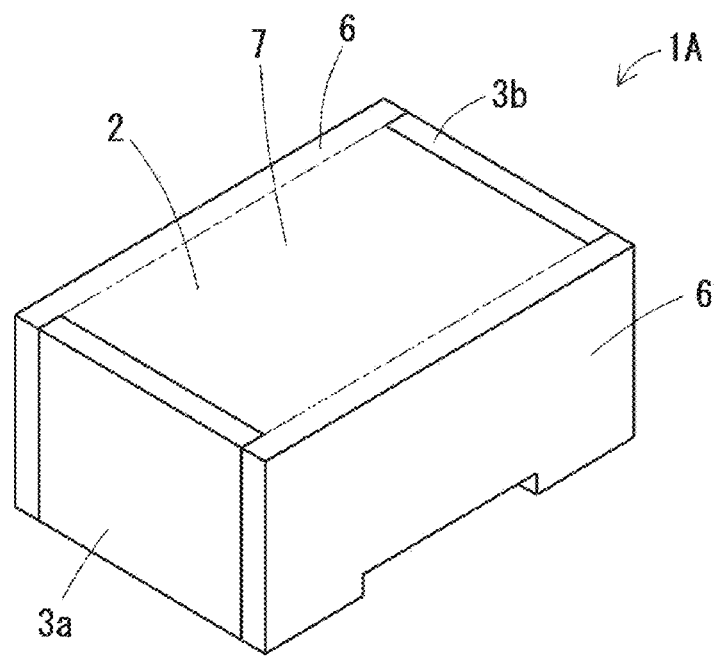
FIG. 7 is a perspective view of an example multilayer ceramic electronic component according to another embodiment of the present disclosure.
Figure 8:
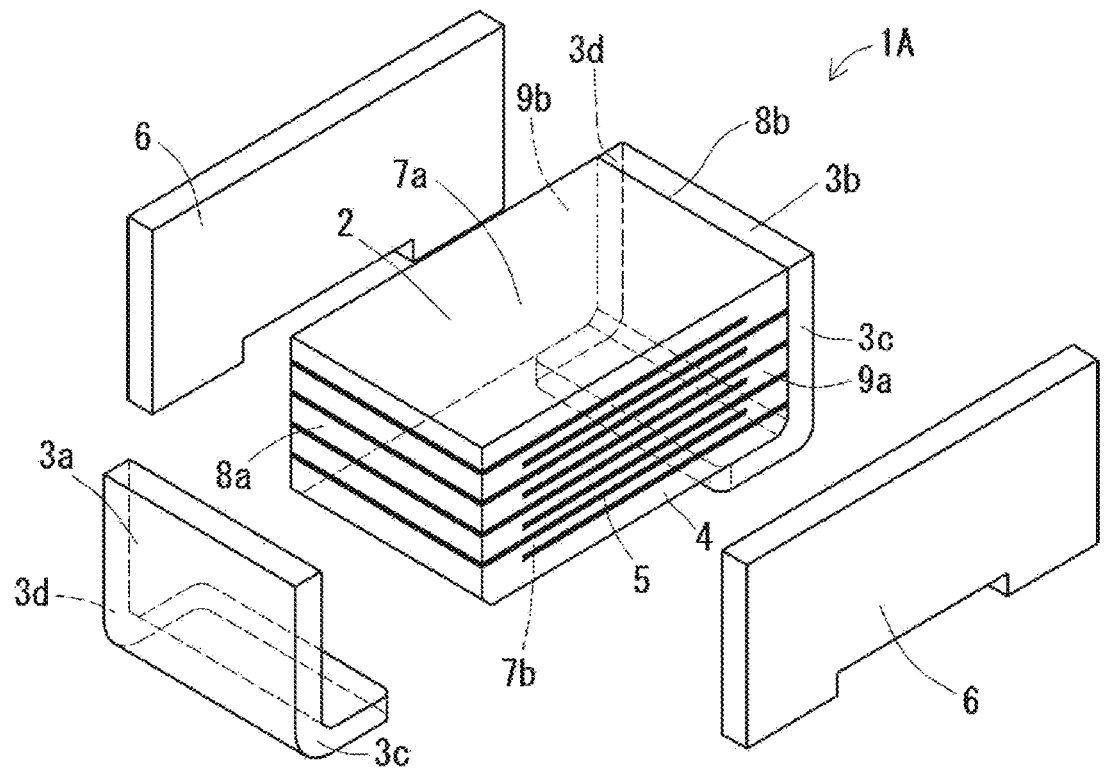
FIG. 8 is an exploded perspective view of the multilayer ceramic electronic component in FIG. 7.

FIG. 7 is a perspective view of an example multilayer ceramic electronic component according to another embodiment of the present disclosure. FIG. 8 is an exploded perspective view of the multilayer ceramic electronic component in FIG. 7. In the present embodiment, a multilayer ceramic capacitor 1A has the same or similar structure as the multilayer ceramic capacitor 1 according to the above embodiment except for the structures of the first external electrode 3a, the second external electrode 3b, and the protective layers 6. The same reference numerals denote the same or similar components as those of the multilayer ceramic capacitor 1, and such components will not be described in detail.

In the present embodiment, as illustrated in, for example, FIG. 8, the multilayer ceramic capacitor 1A includes the first external electrode 3a extending from the first end face 8a to the main surface 7a or the main surface 7b (second face 7b in FIG. 8) and the second external electrode 3b extending from the second end face 8b to the main surface 7a or the main surface 7b (second surface 7b in FIG. 8). The protective layers 6 cover the first side surface 9a and the second side surface 9b of the base component 2 and the terminal side surface 3c and the terminal side surface 3d of each of the first external electrode 3a and the second external electrode 3b. As illustrated in, for example, FIGS. 7 and 8, the protective layers 6 have an inverted U shape. In FIG. 7, the boundaries between the base component 2 and the protective layers 6 are indicated by the two-dot-dash lines for ease of explanation. However, the actual boundaries may appear unclear.

In the same or similar manner as the multilayer ceramic capacitor 1 according to the above embodiment, multilayer ceramic capacitors 1A can be mounted adjacent to each other at a small distance s. The multilayer ceramic capacitor 1A includes the external electrodes 3 not extending to the other of the main surfaces 7a and 7b (first surface 7a in FIG. 8) of the base component 2. This can increase the thickness of the base component 2 in the stacking direction without increasing the thickness of the multilayer ceramic capacitor 1A. This reduces a size increase of the multilayer ceramic capacitor 1A and increases the achievable capacitance of the multilayer ceramic capacitor 1A.

A multilayer ceramic electronic component according to still another embodiment of the present disclosure will now be described.

Figure 9:
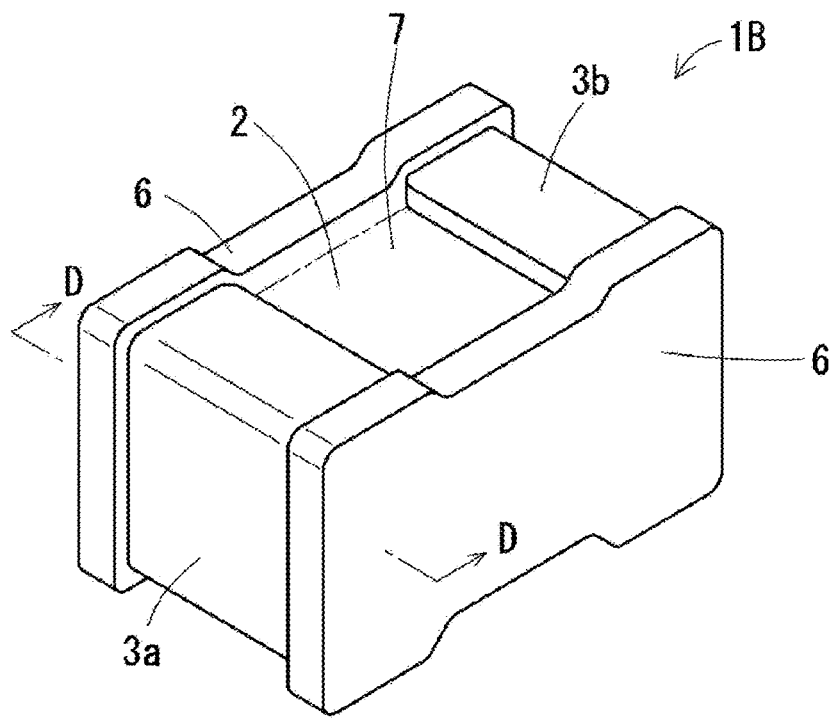
FIG. 9 is a perspective view of an example multilayer ceramic electronic component according to still another embodiment of the present disclosure.
Figure 10:
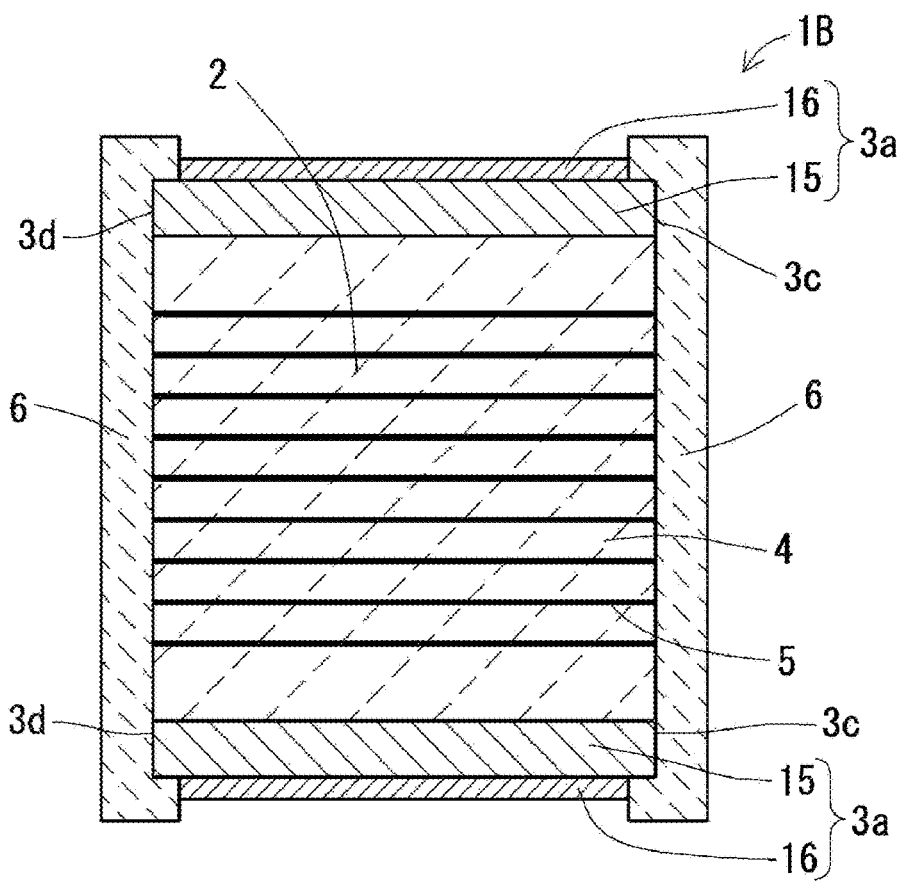
FIG. 10 is a cross-sectional view taken along line D-D in FIG. 9.

FIG. 9 is a perspective view of an example multilayer ceramic electronic component according to still another embodiment of the present disclosure. FIG. 10 is a cross-sectional view taken along line D-D in FIG. 9. In the present embodiment, a multilayer ceramic capacitor 1B has the same or similar structure as the multilayer ceramic capacitor 1 and the multilayer ceramic capacitor 1A according to the above embodiments except for the structure of the protective layers 6. The same reference numerals denote the same or similar components as those of the multilayer ceramic capacitor 1 and the multilayer ceramic capacitor 1A, and such components will not be described in detail.

In the present embodiment, the multilayer ceramic capacitor 1B includes, as illustrated in, for example, FIG. 9, the protective layers 6 extending to the main surfaces 7a and 7b of the base component 2 from the side surfaces 9a and 9b of the base component 2 and the terminal side surfaces 3c and the terminal side surfaces 3d of the first external electrode 3a and the second external electrode 3b. The protective layers 6 extend to surfaces of the first external electrode 3a and the second external electrode 3b continuous with the terminal side surfaces 3c and the terminal side surfaces 3d. As illustrated in, for example, FIG. 10, the protective layers 6 cover the base component 2 and the underlayers 15 laterally (in the right-left direction in FIG. 10) and extend to the surfaces of the underlayers 15 adjacent to the main surfaces 7a and 7b. The plated outer layers 16 are formed in the portions of the surfaces of the underlayers 15 including no protective layer 6.

The multilayer ceramic capacitor 1B includes the protective layers 6 extending to the main surfaces 7a and 7b from the side surfaces 9a and 9b of the base component 2. This structure increases the physical distance between the first external electrodes 3a and between the second external electrodes 3b of adjacent multilayer ceramic capacitors 1B mounted on a circuit board, reducing short-circuiting between the adjacent multilayer ceramic capacitors 1B. This improves the reliability of the circuit board on which the multilayer ceramic capacitors 1B are densely mounted.

The protective layers 6 may extend from the first side surface 9a and the second side surface 9b to the first surface 7a and the second surface 7b and to the first end face 8a and the second end face 8b of the base component 2. This effectively reduces short-circuiting between the adjacent multilayer ceramic capacitors 1B and further improves the reliability of the circuit board on which the multilayer ceramic capacitors 1B are densely mounted.

A method for manufacturing a multilayer ceramic electronic component according to one embodiment of the present disclosure will now be described with reference to FIGS. 11 to 21. With the method for manufacturing the multilayer ceramic electronic component according to the present embodiment, the form of the base component 2 changes in green machining performed before firing. For ease of explanation, the base component 2 with the underlayers 15 formed on the external electrodes 3 may be referred to as a second base component, and the second base component with the protective layers 6 formed may be referred to as a third base component, with reference to the exploded perspective view illustrated in FIG. 2.

A ceramic mixture powder containing an additive and $BaTiO_3$ as a material of the ceramic layers 4 is first wet-ground and mixed with a bead mill and then mixed with a polyvinyl butyral binder, a plasticizer, and an organic solvent to obtain ceramic slurry.

A die coater is then used to shape a ceramic green sheet 10 on a carrier film. The ceramic green sheet 10 may have a thickness of, for example, about 0.5 to 10 μm. A thinner ceramic green sheet 10 can increase the capacitance of the multilayer ceramic capacitor 1. The ceramic green sheet 10 may be shaped with, for example, a doctor blade coater or a gravure coater, rather than with the die coater.

Figure 11:
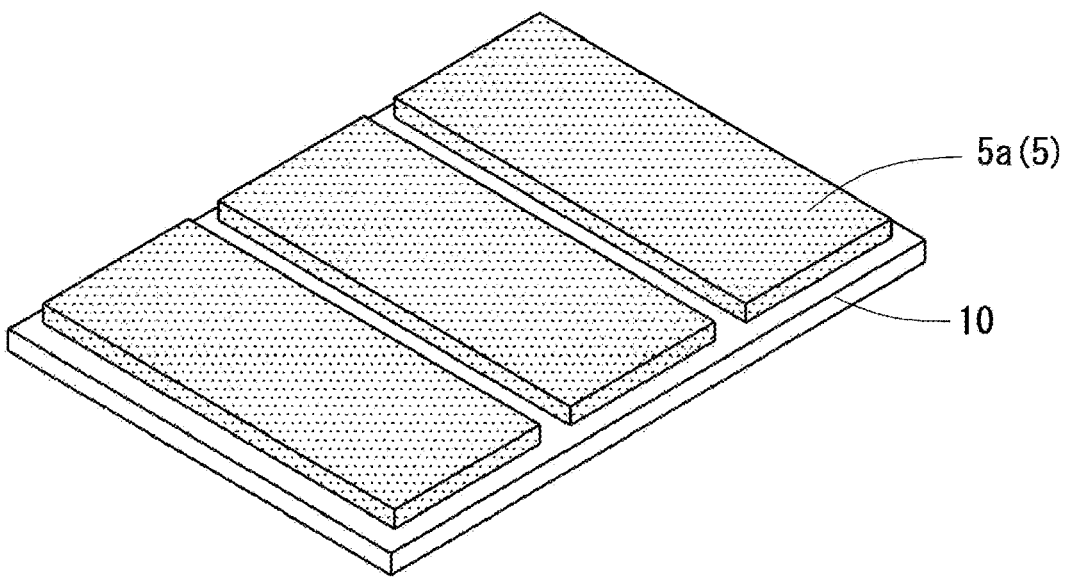
FIG. 11 is a perspective view of a ceramic green sheet on which a conductive paste is printed.

As illustrated in, for example, FIG. 11, a conductive paste 5a containing a metal material, which is to be the internal electrode layers 5, is printed by gravure printing on the ceramic green sheet 10 shaped as above in a strip pattern in multiple rows. The conductive paste 5a may contain a metal such as Ni, Pd, Cu, or Ag, or an alloy of these metals. The conductive paste 5a may be printed by, for example, screen printing, rather than by gravure printing.

Thinner internal electrode layers 5 that allow the capacitor to function can reduce internal defects resulting from internal stress. For a multilayer ceramic capacitor with a stack of many layers, the internal electrode layers 5 may each have a thickness of about 1.5 μm or less.

Figure 12:
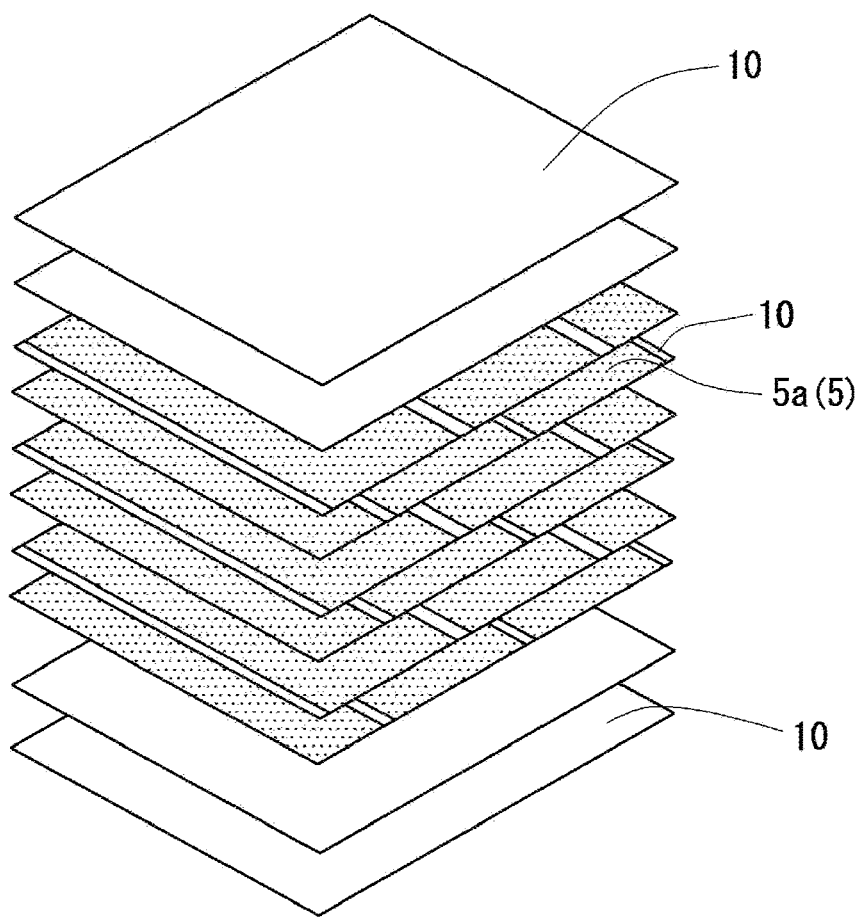
FIG. 12 is an external view of a stack of multiple layers of ceramic green sheets on which the conductive paste is printed.

As illustrated in, for example, FIG. 12, a predetermined number of ceramic green sheets 10 with printed internal electrode layer patterns made of the conductive paste 5a are stacked on a stack of a predetermined number of ceramic green sheets 10, and a predetermined number of ceramic green sheets 10 are stacked on the stack of ceramic green sheets 10 with printed internal electrode layer patterns. The ceramic green sheets 10 with the printed internal electrode layer patterns are stacked with the patterns of the internal electrode layers deviating from one another by half the dimension in the width direction. Although not illustrated, the ceramic green sheets 10 are stacked on a support sheet. The support sheet may be a sheet that is adhesive and releasable, such as a low-tack sheet or a foam releasable sheet.

Figure 13:
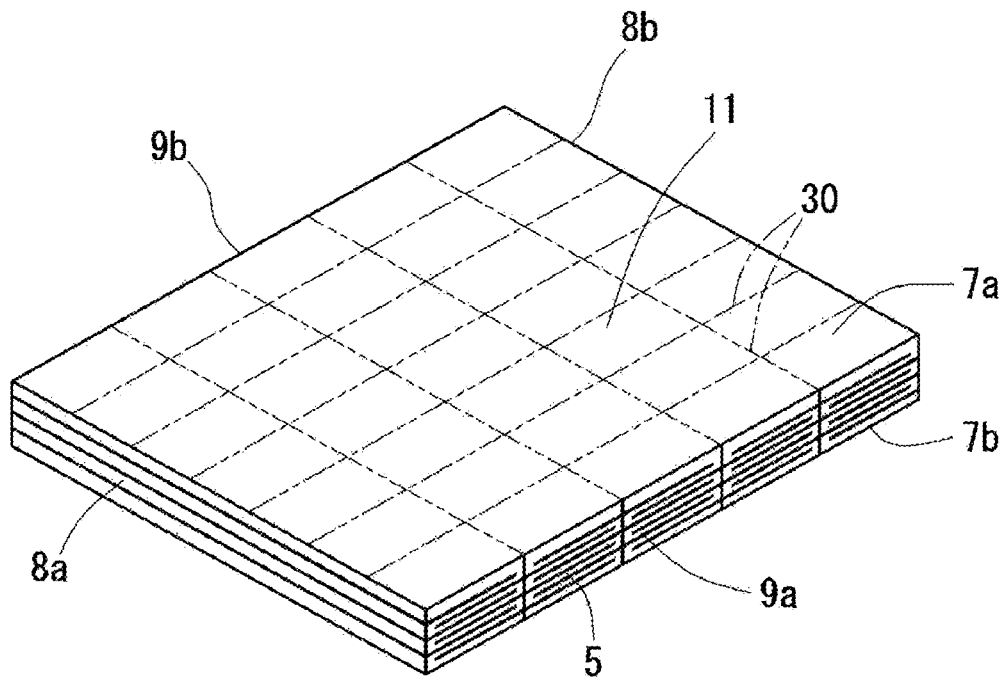
FIG. 13 is a perspective view of a multilayer base.

The stack of the ceramic green sheets 10 are then pressed in the stacking direction by hydrostatic pressing to be a multilayer base 11 including the ceramic green sheets 10 integral with one another as illustrated in, for example, FIG. 13. In FIG. 13, imaginary separation lines 30 on the surface of the multilayer base 11 are indicated by the two-dot-dash lines. Each piece sectioned by the imaginary separation lines 30 corresponds to the base component 2 illustrated in FIG. 3. The multilayer base 11 includes a pair of main surfaces, which correspond to the main surfaces 7a and 7b of the base component 2. The multilayer base 11 includes a pair of end faces, which correspond to the end faces 8a and 8b of the base component 2. The multilayer base 11 includes a pair of side surfaces, which correspond to the side surfaces 9a and 9b of the base component 2. In the example described below, a portion of a workpiece in each process in the method for manufacturing the multilayer ceramic electronic component may be identified using the name of the corresponding portion of the multilayer ceramic electronic component 1. Although not illustrated, the support sheet, which is used in stacking the ceramic green sheets 10, is located on the lower surface of the multilayer base 11.

The multilayer base 11 is then cut at predetermined intervals using a press-cutter into multiple first rods 12. The cutting of the multilayer base 11 into the multiple first rods 12 may hereafter be referred to as first cutting. The surfaces of the first rods 12 resulting from the first cutting may be referred to as a first cut surface CP1 and a second cut surface CP2. The first cut surface CP1 corresponds to the first end face 8a of the base component 2, and the second cut surface CP2 corresponds to the second end face 8b of the base component 2. The internal electrode layers 5 with one polarity are exposed on one of the first cut surface CP1 or the second cut surface CP2, and the internal electrode layers 5 with the other polarity are exposed on the other surface. The multilayer base 11 may be cut using, for example, a dicing saw, rather than with the press-cutter.

Figure 14:
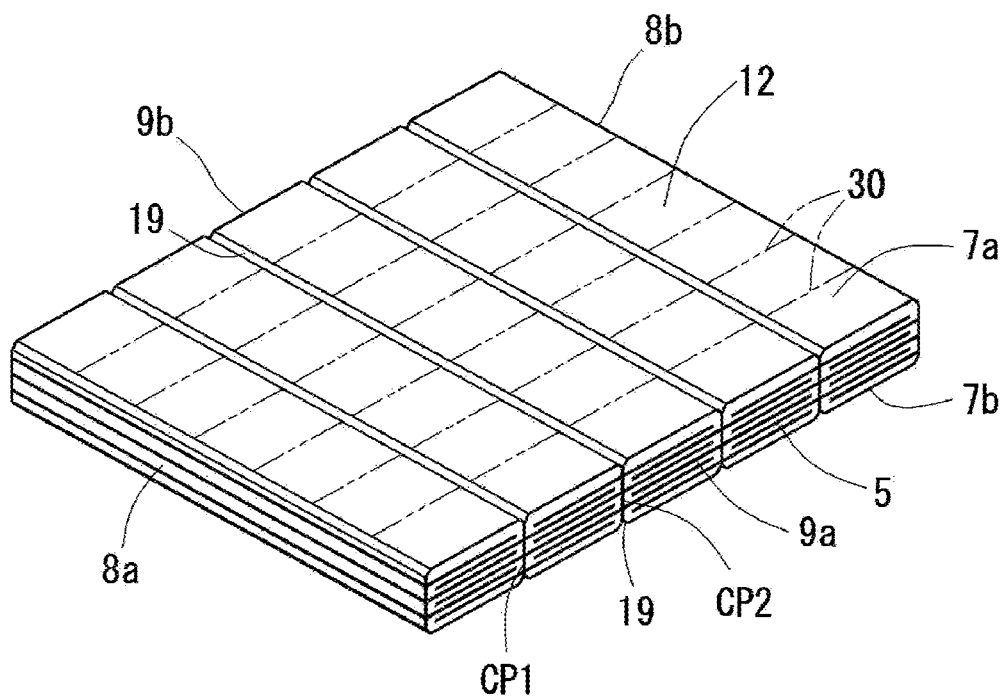
FIG. 14 is a perspective view of chamfered first rods resulting from cutting of the multilayer base.

As illustrated in, for example, FIG. 14, after the multilayer base 11 undergoes the first cutting, V-shaped grooves (hereafter referred to as V-grooves) 19 with a depth of about 10 μm from the first surface 7a are formed at the positions cut in the first cutting. The V-grooves 19 may be formed using, for example, a dicing saw. Subsequently, after reattaching the support sheet onto the opposite second surface 7b, V-grooves 19 with a depth of about 10 μm from the second surface 7b are formed at the positions cut in the first cutting. The V-grooves 19 may be formed before the first cutting.

The V-grooves 19 chamfer the edges resulting from the first cutting. The chamfered edges allow formation of the underlayers 15 with a thickness of at least a predetermined value. Each first rod 12 has a shape as illustrated in, for example, FIG. 3 as viewed in the longitudinal direction (a direction orthogonal to the end faces 8). The first rod 12 may have a chamfer distance b greater than or equal to 4 µm. The chamfer distance b refers to the shortest distance from an intersection line between the extension surfaces of the main surfaces 7a and 7b and the extension surfaces of the end faces 8a and 8b (the first cut surface CP1 and the second cut surface CP2) to the surface of the first rod 12. When the chamfer distance b is less than or equal to 3 µm, the underlayers 15 are likely to be thinner at the corners between the main surfaces 7a and 7b and the end faces 8a and 8b. Each underlayer 15 may thus be discontinuous, reducing the electrical reliability of the multilayer ceramic capacitor. With the chamfered edges between the main surfaces 7a and 7b and the end faces 8a and 8b, the underlayers 15 can be thick enough at the corners connecting the main surfaces 7a and 7b and the end faces 8a and 8b to improve the electrical reliability of the multilayer ceramic capacitor.

Figure 15:
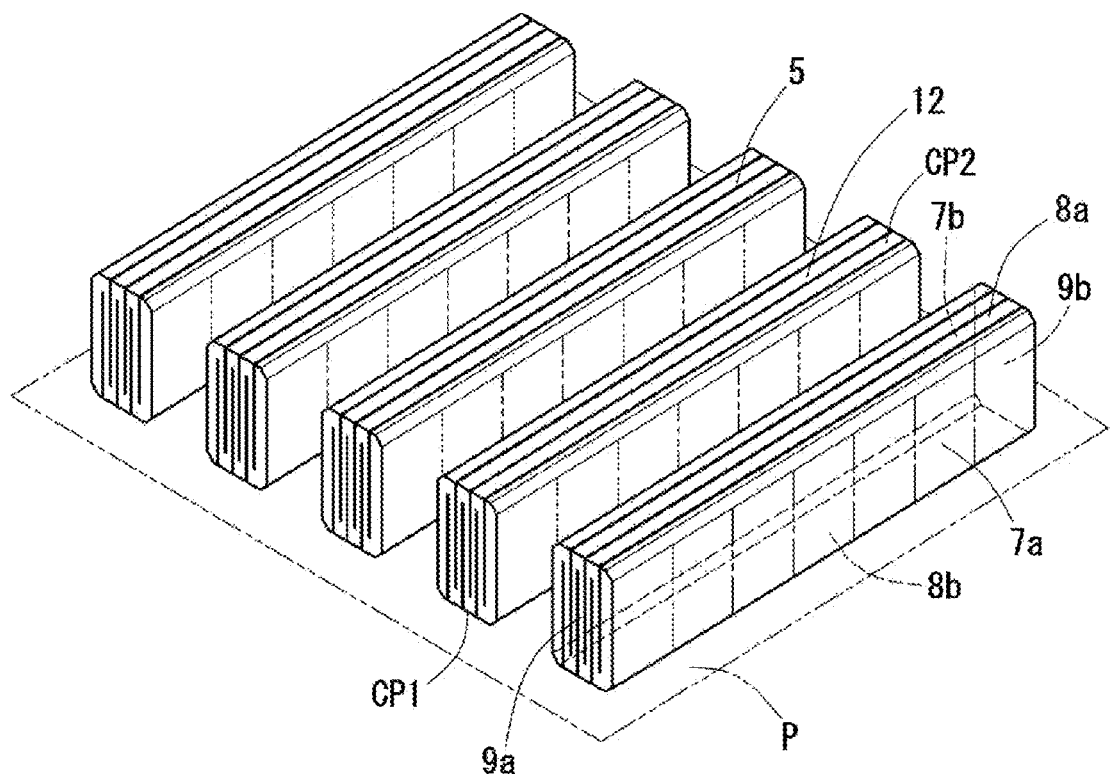
FIG. 15 is a perspective view of the first rods rotated to have their first cut surfaces aligned in an imaginary plane.

Subsequently, as illustrated in, for example, FIG. 15, the multiple first rods 12 are arranged to have the first cut surfaces CP1 or the second cut surfaces CP2 (first cut surface CP1 in FIG. 15) aligned in an imaginary plane P. Although not illustrated, the first rods 12 are fixed on a support sheet 17. The imaginary plane P may be a surface of the support sheet 17. The support sheet 17 temporarily fixes the first rods 12. In the subsequent processes, the base components 2 resulting from separating the rods into pieces are to be released from the support sheet 17. The support sheet 17 may thus be an adhesive sheet that is releasable, such as a high-temperature foam releasable sheet or a temperature-sensing adhesive releasable sheet.

Figure 16:
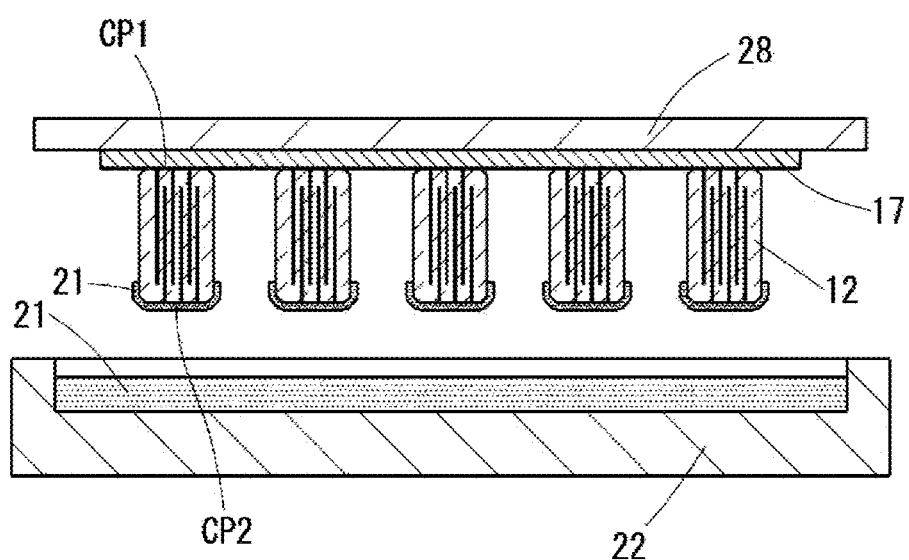
FIG. 16 is a diagram of the first rods with the first cut surfaces coated with an external electrode paste.

As illustrated in, for example, FIG. 16, an external electrode paste 21 to be the underlayers 15 is applied to the other of the first cut surface CP1 or the second cut surface CP2 (second cut surface CP2 in FIG. 16) of each first rod 12. In the present embodiment, the second cut surfaces CP2 of the first rods 12 are immersed in the external electrode paste 21 at a predetermined depth, and then removed from the external electrode paste 21 to be dried. The support sheet 17 is then reattached, and the external electrode paste 21 is applied to the first cut surfaces CP1 of the first rods 12 in the same or similar process as described above.

The external electrode paste 21 contains an inorganic material, a binder, and a solvent. The inorganic material contains a ceramic material containing, as the main component, barium titanate being the same as or similar to barium titanate contained in the ceramic layers 4 of the base component 2 and a conductive metal material containing, as the main component, nickel or a nickel alloy being the same as or similar to nickel or the nickel alloy contained in the internal electrode layers 5. The sintering behavior of the underlayers 15 and the base component 2 at high temperatures can thus be similar to each other in the subsequent firing. This allows the ceramic material of the underlayers 15 to be bonded with the dielectric ceramic layers 4 of the base component 2 by sintering and the conductive metal material of the underlayers 15 to be bonded with the internal electrode layers 5 of the base component 2 by sintering, firmly bonding the underlayers 15 to the base component 2.

Figure 17:
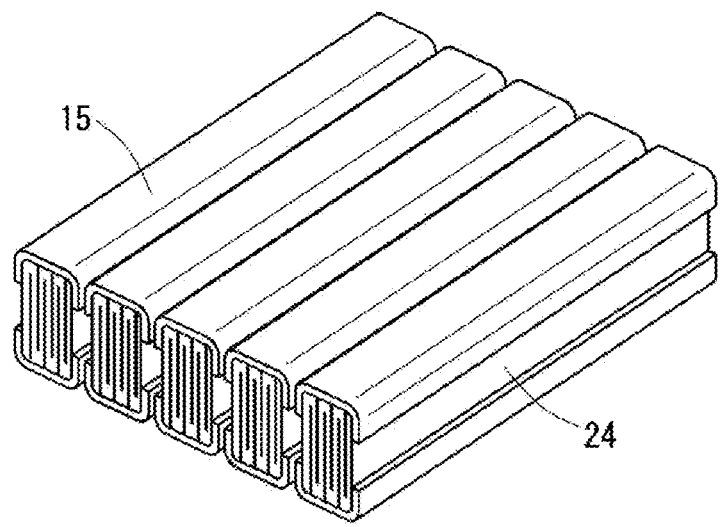
FIG. 17 is a perspective view of second rods on which underlayers are formed.

The first rods 12 to which the external electrode paste 21 is applied may be hereafter referred to as second rods 24 to be distinguished from the first rods 12. FIG. 17 illustrates multiple second rods 24 being aligned.

Figure 18:
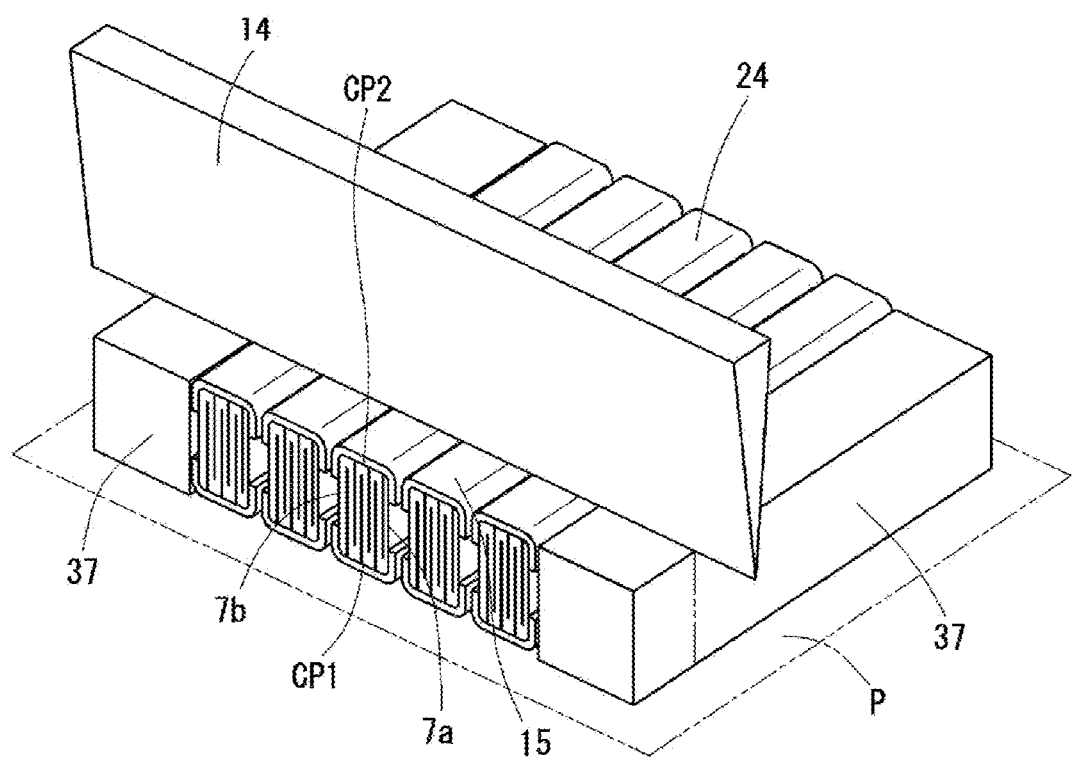
FIG. 18 is a perspective view of the second rods being cut.

As illustrated in, for example, FIG. 18, an assembly of the second rods 24 undergoes second cutting with a press-cutting device including a press-cutting blade 14. The assembly of the second rod 24 may have the first cut surfaces CP1 or the second cut surfaces CP2 (first cut surfaces CP1 in FIG. 18) resulting from the first cutting aligned in an imaginary plane P. The imaginary plane P may be a surface of a cutting plate (not illustrated). In other words, the assembly may include the second rods 24 assembled with their longer sides of the sides excluding the longitudinal sides extending in the vertical direction. The second rods 24 assembled with the main surfaces 7a and 7b extending vertically in the manner described above can be cut at once with improved production efficiency.

In the second cutting, as illustrated in, for example, FIG. 18, a pair of dummy members 37 may be placed on both sides of the assembly of the second rods 24 to place the second rods 24 in position between the dummy members 37. The pair of dummy members 37 may be cut together with the second rods 24 in the second cutting. When the second rods 24 are arranged to have the main surfaces 7a and 7b of adjacent second rods 24 to face each other, the main surfaces 7a and 7b are perpendicular to the surface of the cutting plate. This allows more second rods 24 to be placed on the cutting plate with improved production efficiency. As illustrated in, for example, FIG. 18, when the second rods 24 are assembled with the main surfaces 7a and 7b in contact with each other, small portions of the external electrodes 3 (underlayers 15) are substantially in contact with each other. The base components 2 are thus less likely to be in contact with or joined to each other in the second cutting.

The dummy members 37 to be cut together with the second rods 24 located on both sides of the assembly reduce the likelihood of the second rods 24 changing their positions or orientations in the second cutting. After the second cutting, the second rods 24 are chip components with the underlayers 15. These chip components may be referred to as second base components 13 to be distinguished from the base components 2.

Figure 19:
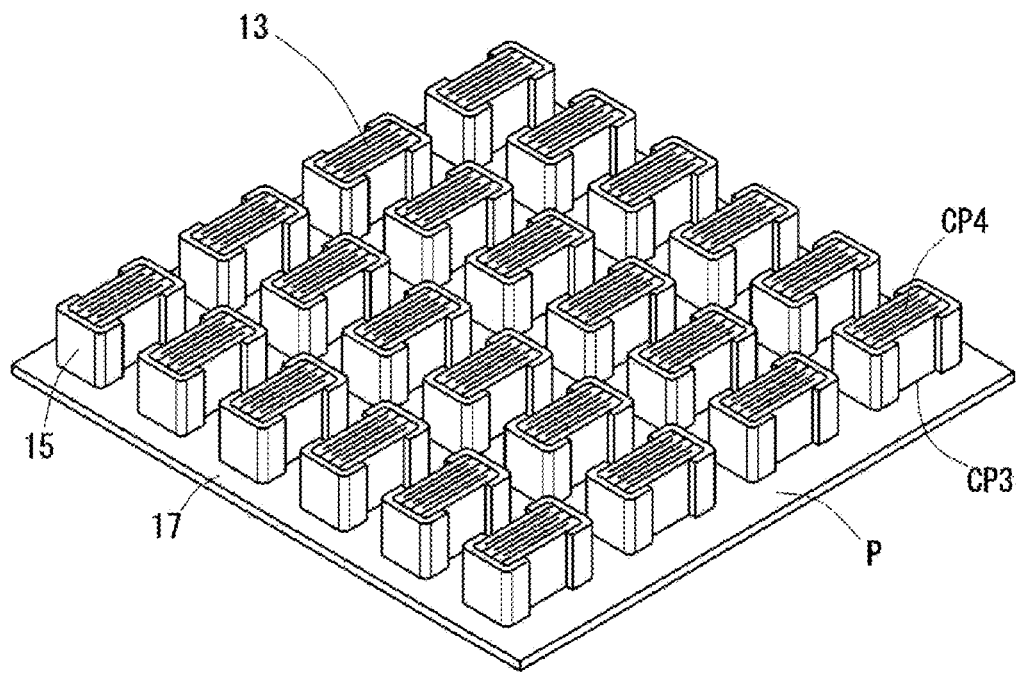
FIG. 19 is a perspective view of second base components cut into chips, aligned with their cut surfaces facing in the vertical direction.

As illustrated in, for example, FIG. 19, multiple second base components 13 are then arranged with third cut surfaces CP3 or fourth cut surfaces CP4 (third cut surfaces CP3 in FIG. 19) resulting from the second cutting aligned in an imaginary plane P. The imaginary plane P may be a surface of the support sheet 17 onto which the second base components 13 may be fixed. The support sheet 17 temporarily fixes the second base components 13 until the second base components 13 are released in the subsequent process. The support sheet 17 may thus be an adhesive sheet that is releasable, such as a high-temperature foam releasable sheet or a temperature-sensing adhesive releasable sheet.

Figure 20:
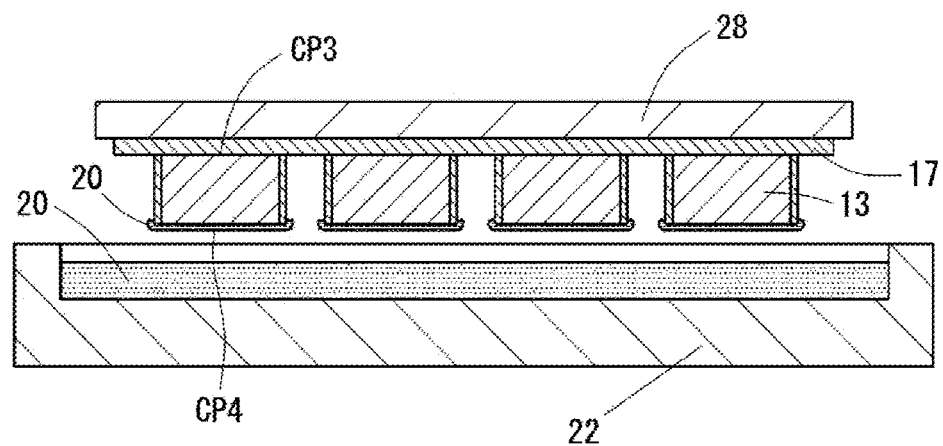
FIG. 20 is a schematic cross-sectional view of the second base components with a ceramic paste applied.

The protective layers 6 containing a ceramic material are then formed on the side surfaces of the second base components 13. As illustrated in FIG. 20, side surfaces (fourth cut surfaces CP4) of the second base components 13 facing upward in FIG. 19 are turned downward, then immersed in a ceramic paste 20 contained in a pool 22, and removed from the ceramic paste 20 to be dried. Subsequently, the support sheet 17 is reattached to the surface on which the ceramic paste 20 is applied. The same process is repeated to apply the ceramic paste 20 to the opposite side surfaces (third cut surfaces CP3) by immersion. The ceramic paste 20 is then dried. After drying, the ceramic paste 20 serves as the protective layers 6 and extends from the side surfaces 9a and 9b and the terminal side surfaces 3c and the terminal side surfaces 3d of each second base component 13 to the surfaces adjacent to such side surfaces. The protective layers 6 after drying may have a thickness of 5 to 30 μm. When the amount of extension of the protective layers 6 to the adjacent surfaces is larger, the surface area of the first external electrode 3a and the second external electrode 3b may decrease and cause difficulty in mounting onto a circuit board. The amount of extension of the protective layers 6 to the adjacent surfaces may be 0 to 50 μm. The ceramic paste 20 may contain a component being the same as or similar to the main component of the ceramic layers 4 or the main component of the protective layers 6. In place of the ceramic paste 20, a ceramic slurry containing a component being the same as or similar to the main component of the ceramic layers 4 or the main component of the protective layers 6 may be used. In forming the protective layers 6, the support sheet 17 on which the second base components 13 are fixed may be fixed on a flat plate 28 as illustrated in, for example, FIG. 20. This facilitates the handling of the multiple second base components 13.

Figure 21:
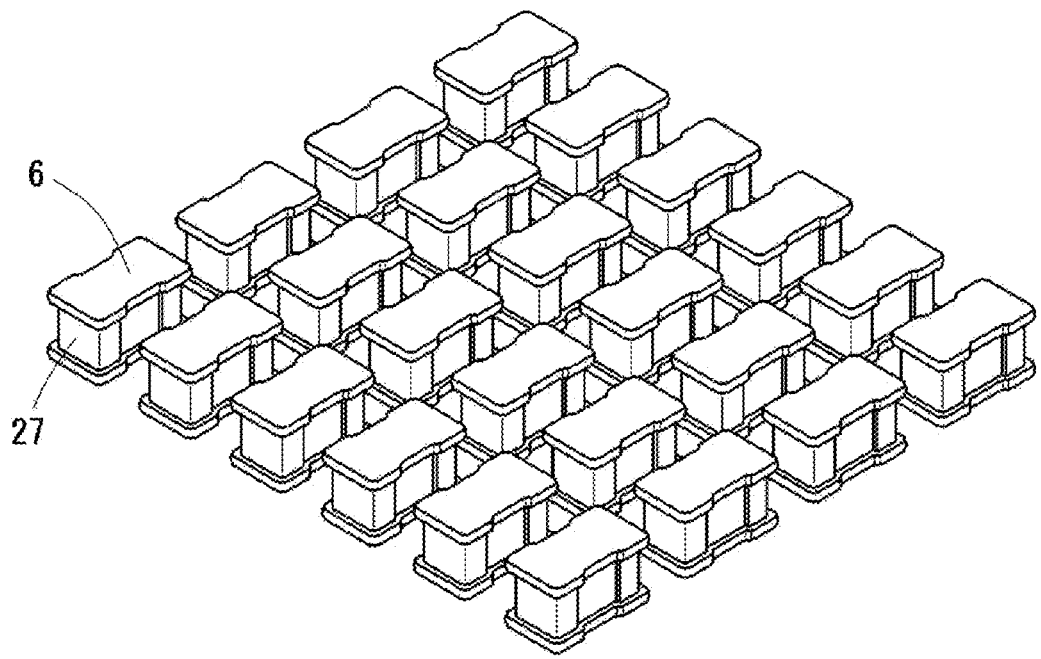
FIG. 21 is a perspective view of the second base components on which protective layers are formed.

FIG. 21 illustrates third base components 27 with the protective layers 6 formed in the process described with reference to FIG. 20. The third base components 27 shrink uniformly by sintering in the subsequent firing process. FIG. 21 thus illustrates the third base components 27 before and after firing.

The third base components 27 then undergo barrel polishing to be chamfered. Chamfering is performed to round the corners on the third base components 27 and remove burrs. In the present embodiment, the third base components 27 after firing and a polishing material are placed in a pot containing water and rotated for polishing.

The plated outer layers 16 are then formed on the surfaces of the underlayers 15. In the present embodiment, the plated outer layers 16 are multilayers. Ni plating layers are first formed on the surfaces of the underlayers 15 in an electrolytic plating bath. The surfaces of the Ni plating layers are coated with Sn plating layers. This completes the manufacture of the multilayer ceramic capacitor 1 illustrated in FIG. 9.

A method for manufacturing a multilayer ceramic electronic component according to another embodiment of the present disclosure will be described below with reference to FIGS. 22A to 26. In the present embodiment, the method for manufacturing the multilayer ceramic electronic component is used to manufacture the multilayer ceramic capacitor 1 illustrated in FIG. 1. The method is the same as the method for manufacturing the multilayer ceramic electronic component according to the above embodiment until the second rods 24 (refer to FIG. 17) with the underlayers 15 are obtained.

Figure 22A:
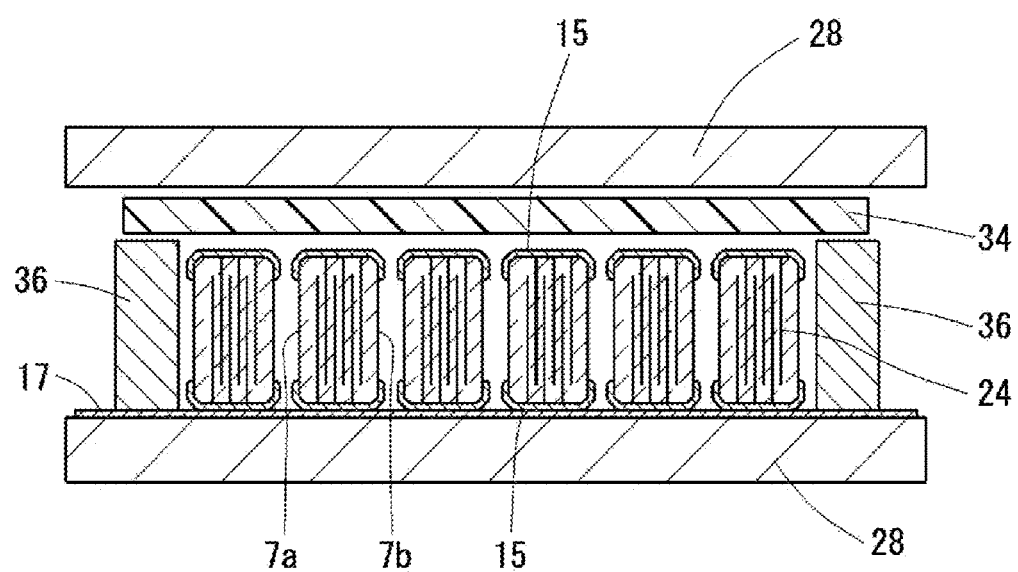
FIG. 22A is a schematic cross-sectional view of an assembly of the second rods fixed to one another with a molten thermoplastic resin sheet.

As illustrated in, for example, FIG. 22A, the multiple second rods 24 illustrated in FIG. 17 are aligned into an assemble on the adhesive support sheet 17 that is releasable, with the main surfaces 7a and 7b facing each other. A thermoplastic resin sheet 34 is placed above the assembly. The flat plates 28 are placed above and below the second rods 24 on the support sheet 17, the resin sheet 34, and frame-like or columnar spacers 36 surrounding the second rods 24. The height of the spacers 36 is set to be about 0 to 0.1 mm greater than the height of the second rods 24. The height of the spacers 36 may depend on the dimensions of the multilayer ceramic capacitor to be manufactured, but may be high enough to accommodate the variation in height of the second rods 24 to reduce the amount of resin used in the subsequent process.

Figure 22B:
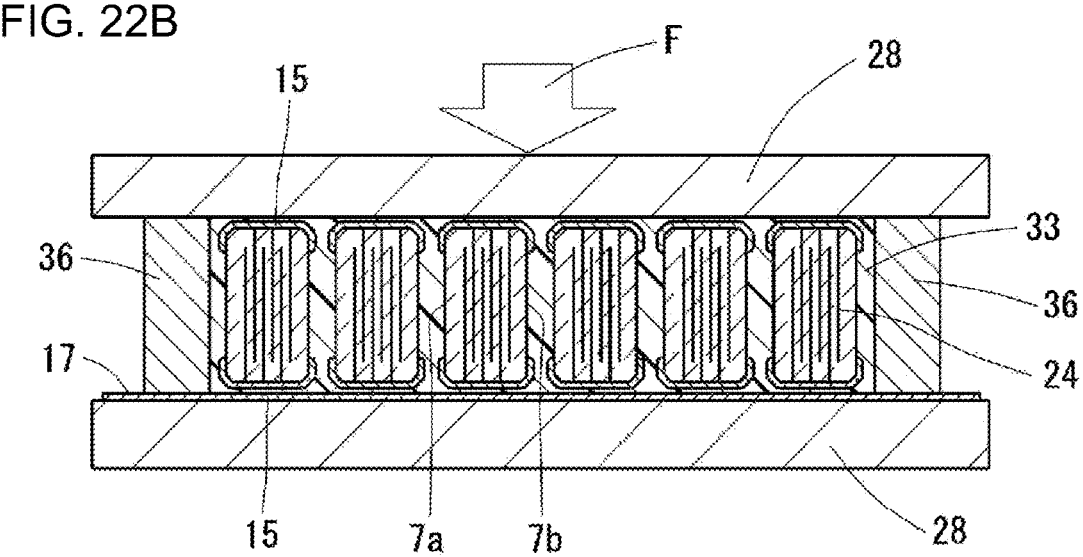
FIG. 22B is a schematic cross-sectional view of the assembly of the second rods fixed to one another with the molten thermoplastic resin sheet.

As illustrated in, for example, FIG. 22B, the resin sheet 34 is then pressed in the direction indicated by arrow F with heat. The heat melts the resin sheet 34, which then flows into gaps between adjacent second rods 24. In this state, the frame-like or columnar spacers 36 provide a space between the flat plates 28 located above and below the second rods 24 and reduce flowing out of the molten resin sheet 34. The molten resin sheet 34 is then cooled to be a thermoplastic resin 33 filling the gaps between adjacent second rods 24. This forms an assembly (also referred to as a flat rod block) 23 with its periphery coated with the thermoplastic resin 33.

Figure 23:
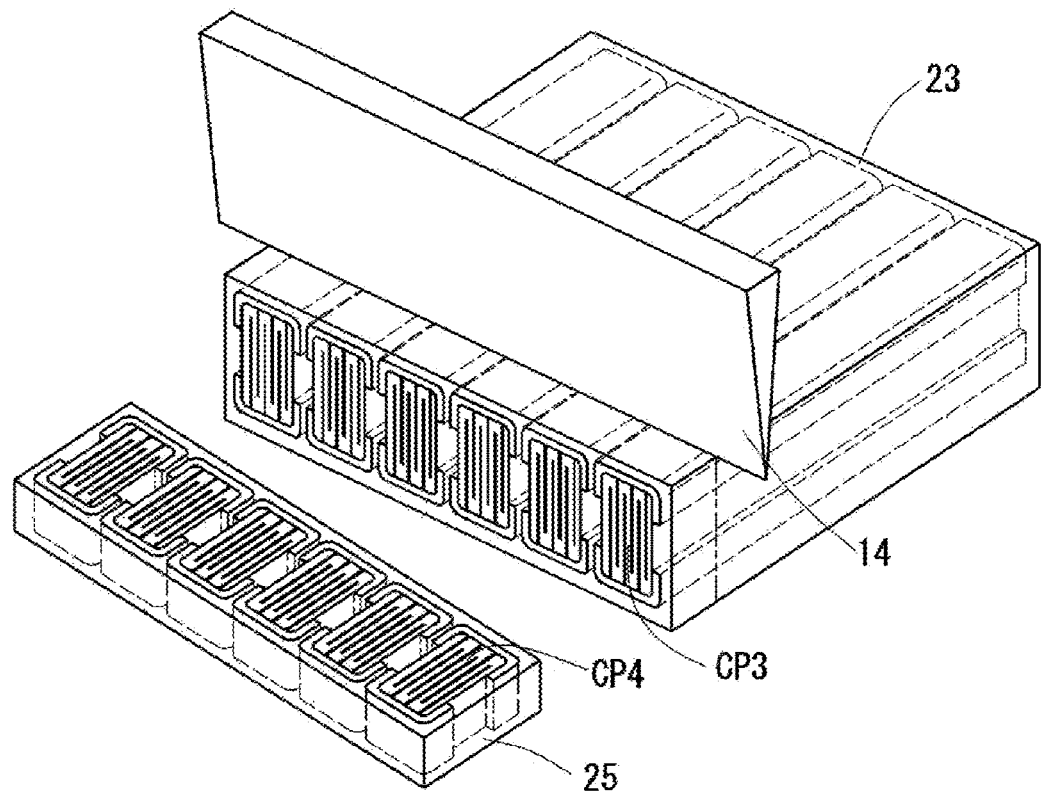
FIG. 23 is a perspective view of the assembly being cut into third rods.
Figure 24:
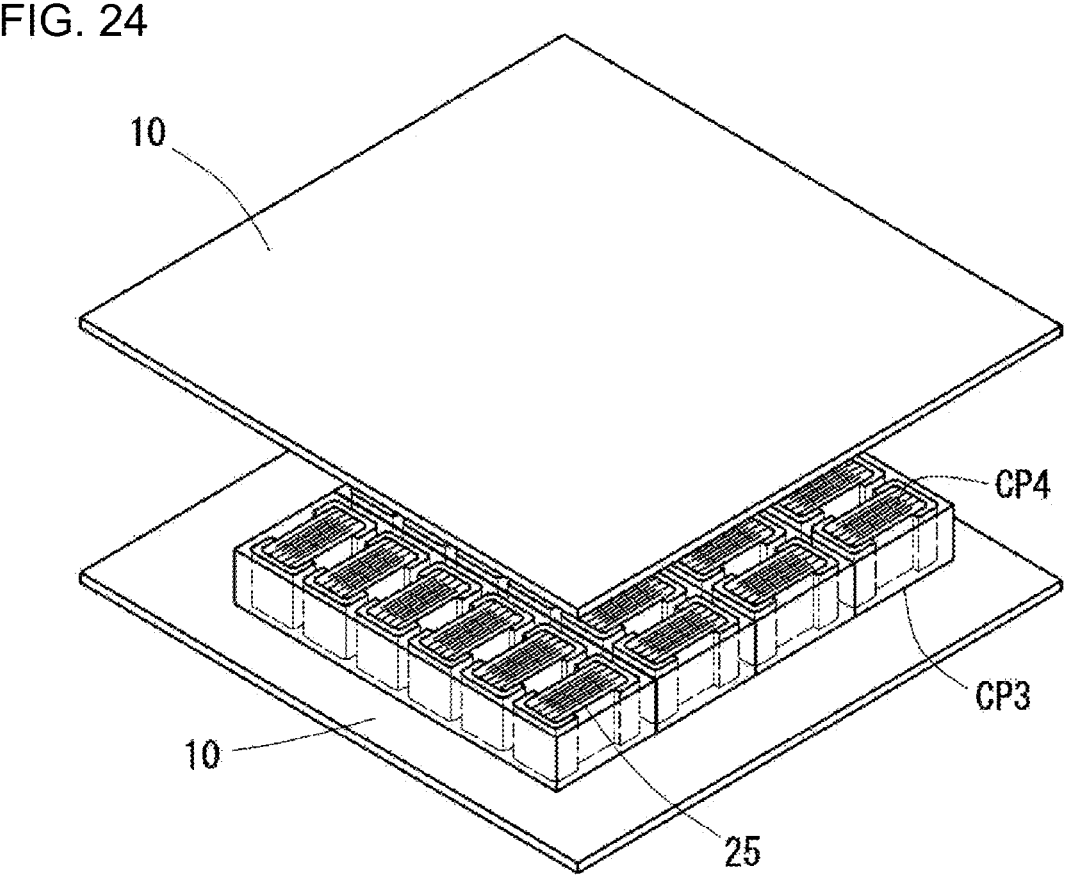
FIG. 24 is a perspective view of the third rods receiving ceramic green sheets on their cut surfaces.

As illustrated in, for example, FIG. 23, the assembly 23 is cut (second cutting) at predetermined intervals in a direction perpendicular to the longitudinal direction of the second rods 24 using a press-cutting blade 14. This forms third rods 25 each including the third cut surface CP3 and the fourth cut surface CP4 opposite to each other. The assembly 23 may be cut using, for example, a dicing saw, rather than with the press-cutting blade 14. Each third rod 25 includes a row of integral base components as chips with the underlayers 15. This facilitates the handling in the subsequent processes and improves the productivity of the multilayer ceramic capacitor 1.

Each third rod 25 is then rotated by 90° about the axis in the longitudinal direction to have the third cut surface CP3 or the fourth cut surface CP4 (fourth cut surface CP4 in FIG. 24) on which the internal electrode layers 5 are exposed facing upward.

The multiple third rods 25 with the third cut surfaces CP3 or the fourth cut surfaces CP4 (fourth cut surfaces CP4 in FIG. 24) facing upward are assembled. As illustrated in, for example, FIG. 24, the ceramic green sheets 10 to be the protective layers 6 are placed on the upper and lower surfaces of the assembly of the third rods 25. The ceramic green sheets 10 may not be placed simultaneously on the upper and lower surfaces of the assembly, but one ceramic green sheet 10 may be placed on each surface separately.

Figure 25:
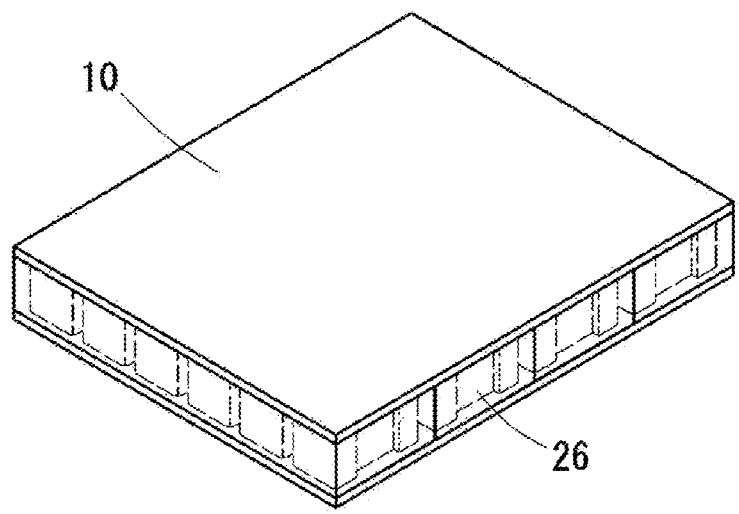
FIG. 25 is a perspective view of the third rods with the ceramic green sheets attached.

The assembly with its upper and lower surfaces receiving the ceramic green sheets 10 then undergoes hydrostatic pressing to have the ceramic green sheets 10 to be the protective layers 6 tightly pressed against the assembly. FIG. 25 illustrates the assembly after the hydrostatic pressing. The third rods 25 serve as fourth rods 26 to which the ceramic green sheets 10 to be the protective layers 6 are attached. As described above, the protective layers 6 are formed on the multiple third rods 25 by placing the ceramic green sheets 10 into contact with the third cut surfaces CP3 and the fourth cut surfaces CP4, transferring the portion of the ceramic green sheet 10 in contact with the third cut surfaces CP3 onto the third cut surfaces CP3, and transferring the portion in contact with the fourth cut surfaces CP4 onto the fourth cut surfaces CP4. The ceramic green sheets 10 to be the protective layers 6 may be single-layer ceramic green sheets or multilayer ceramic green sheets. The layers in the multilayer ceramic green sheet may include different components.

Subsequently, the fourth rods 26 undergo degreasing and firing. The fourth rods 26 are placed on a plate of zirconia. The fourth rods 26 on the plate are then placed in a degreasing furnace to remove the solvent and the binder. The fourth rods 26 are then fired in a firing furnace at a high temperature. The degreasing is partly performed in the atmosphere at about room temperature to 300° C. to remove the solvent and the plasticizer, and then performed in a nitrogen atmosphere up to 800° C. to remove the binder and the resin such as the fixing resin through thermal decomposition and combustion. The firing may be performed at temperatures of, for example, 1100 to 1250° C. in a mixed atmosphere containing hydrogen.

Figure 26:
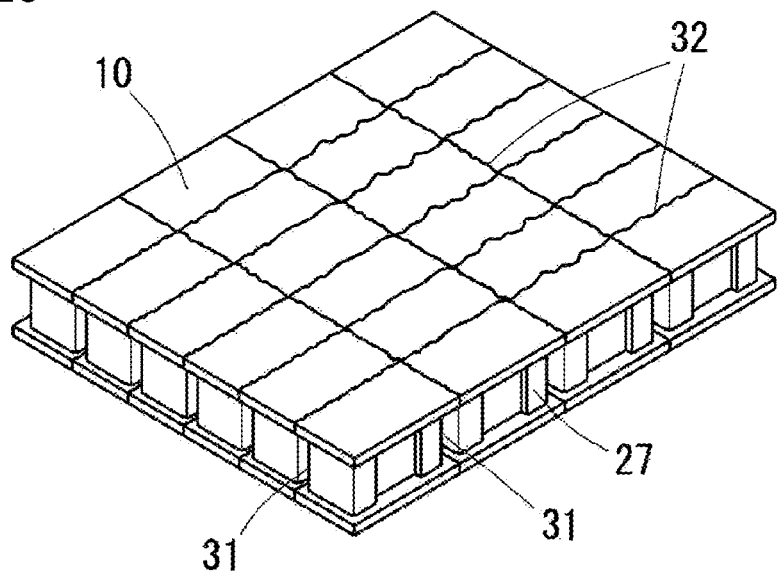
FIG. 26 is a perspective view of the third rods after firing with the ceramic green sheet attached.

The fourth rods 26 after firing lose the thermoplastic resin 33 surrounding the third rods 25 through decomposition and combustion, with voids 31 created between adjacent third base components 27, as illustrated in, for example, FIG. 26. The third base components 27 shrink by sintering, widening the gaps between the third base components 27. This causes cracks in the sintered ceramic green sheets 10 between the third base components 27, forming separation lines 32. This substantially separates the third base components 27 with the external electrodes 3 and the protective layers 6 into individual pieces.

The third base components 27 then undergo barrel polishing to be chamfered. The chamfering is the same as or similar to the chamfering in the above embodiment. Sintering residuals of the ceramic green sheets produced between the third base components 27 are removed by barrel polishing. The process following the chamfering is the same as in the above embodiment and will not be described in detail.

Figure 27:
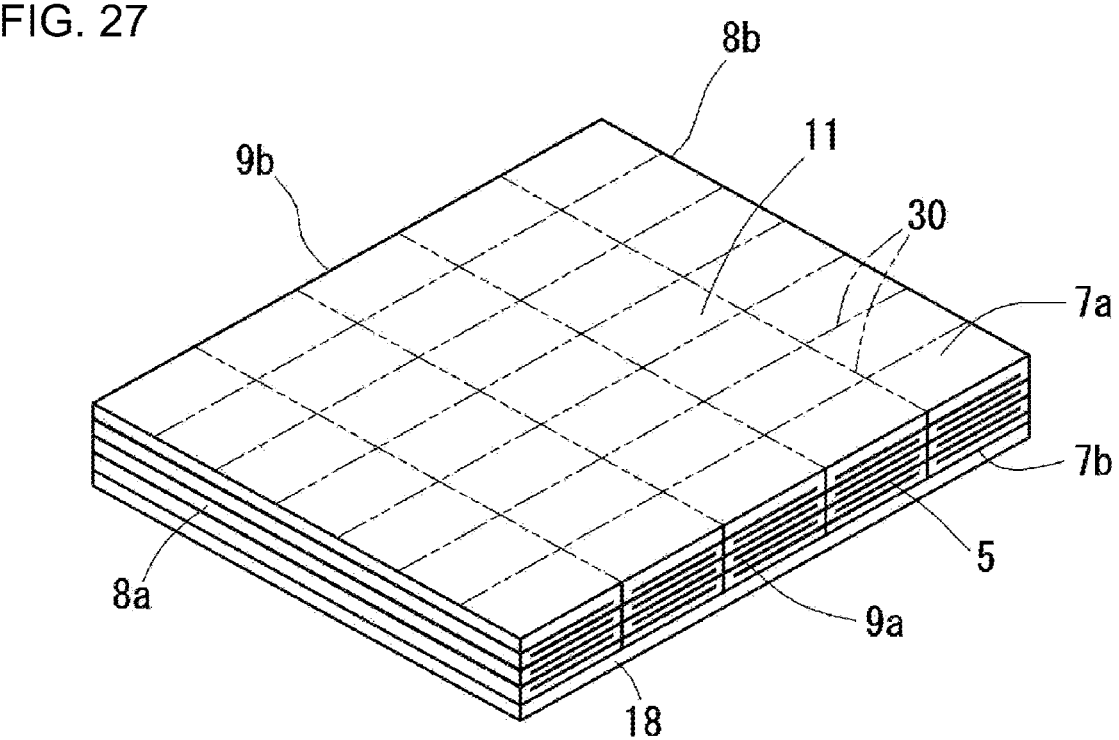
FIG. 27 is a perspective view of a multilayer base stacked on a support sheet.

A method for manufacturing a multilayer ceramic electronic component according to still another embodiment of the present disclosure will now be described with reference to FIGS. 27 to 32. The method for manufacturing the multilayer ceramic electronic component according to the present embodiment is the same as the method for manufacturing the multilayer ceramic electronic components according to the above embodiment until the multilayer base 11 illustrated in FIG. 13 is obtained. The support sheet is not illustrated in FIG. 13. The multilayer base 11 stacked on a support sheet 18 is illustrated in FIG. 27. The support sheet 18 is the same as or similar to the support sheet 17, which may be a high-temperature foam releasable sheet or a temperature-sensing adhesive releasable sheet that loses an adhesive force at high temperatures.

Figure 28:
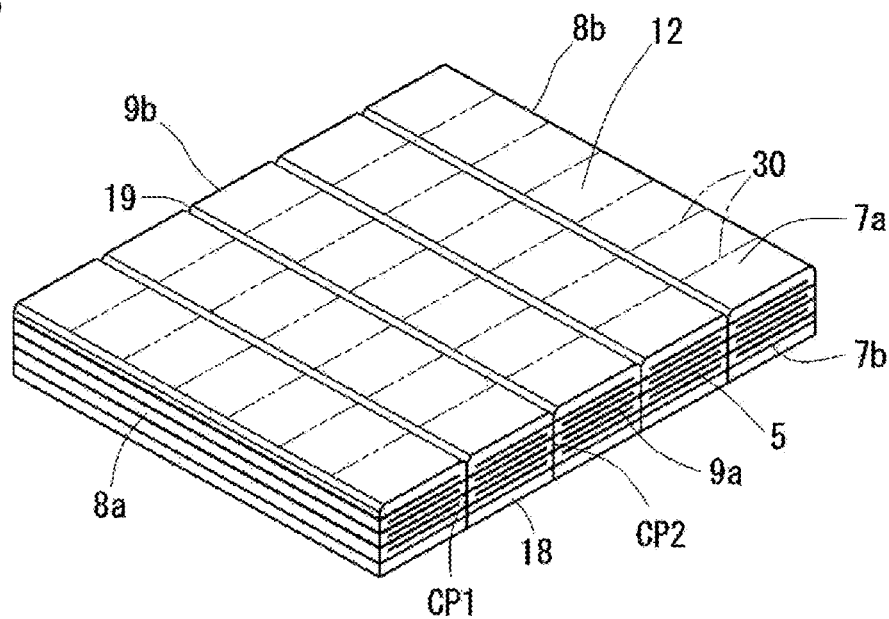
FIG. 28 is a perspective view of chamfered first rods resulting from cutting of the multilayer base together with the support sheet.

As illustrated in, for example, FIG. 28, the multilayer base 11 is first cut at predetermined intervals into the multiple first rods 12 using a press-cutter. In the present embodiment, the support sheet 18 is cut together with the multilayer base 11. The first cut surface CP1 and the second cut surface CP2 resulting from the first cutting correspond to the respective first end face 8a and the second end face 8b of the base component 2 illustrated in FIG. 8. The internal electrode layers 5 with a first polarity are exposed on either the first cut surface CP1 or the second cut surface CP2, and the internal electrode layers 5 with a second polarity are exposed on the other cut surface. The multilayer base 11 may be cut using, for example, a dicing saw, rather than with the press-cutter.

Subsequently, the V-grooves 19 with a depth of about 10 μm from the main surfaces 7a and 7b are formed at the positions cut in the first cutting. The V-grooves 19 may be formed using, for example, a dicing saw. The V-grooves 19 chamfer the edges resulting from the first cutting. The chamfered edges allow formation of the underlayers 15 with a thickness of at least a predetermined value. The V-grooves 19 may be formed before the first cutting.

Figure 29:
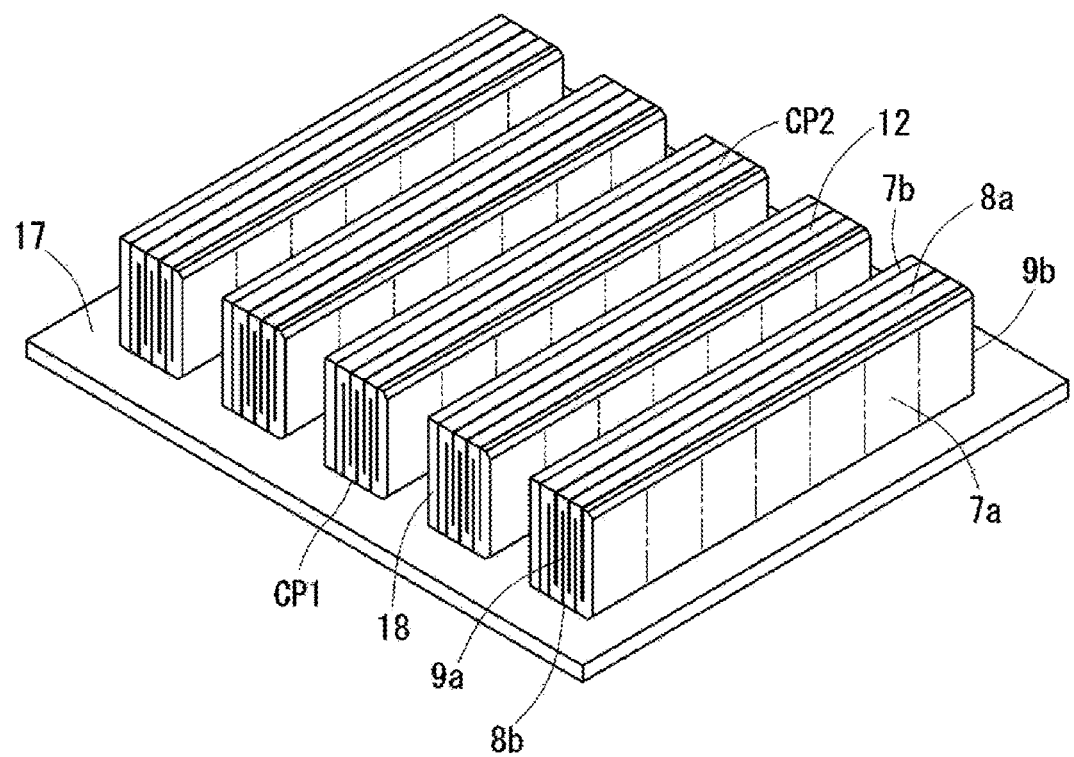
FIG. 29 is a perspective view of the first rods in FIG. 28 rotated to have their cut surfaces facing in the vertical direction.

As illustrated in, for example, FIG. 29, the multiple first rods 12 are arranged and fixed on the support sheet 17 to have the first cut surfaces CP1 or the second cut surfaces CP2 (second cut surfaces CP2 in FIG. 29) facing upward. The support sheet 17 temporarily fixes the first rods 12. The support sheet 17 may be an adhesive sheet that is releasable, such as a high-temperature foam releasable sheet or a temperature-sensing adhesive releasable sheet.

Figure 30:
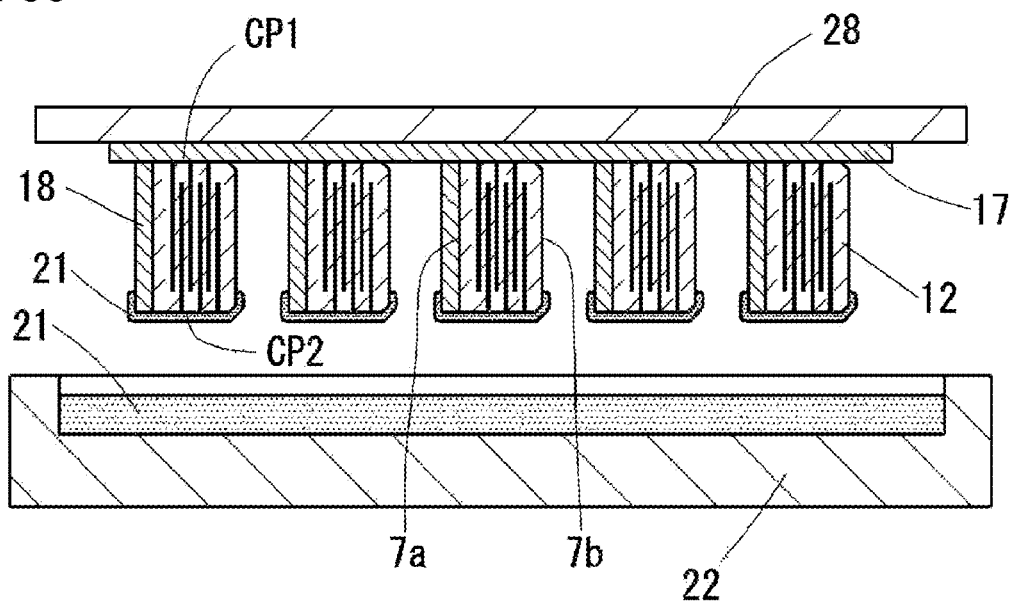
FIG. 30 is a cross-sectional view of the first rods in FIG. 29 with their cut surfaces coated with underlayers.

As illustrated in, for example, FIG. 30, the external electrode paste 21 to be the underlayers 15 is applied to one of the first cut surface CP1 or the second cut surface CP2 (second cut surface CP2 in FIG. 30) of each first rod 12 illustrated in FIG. 29. In the present embodiment, the second cut surfaces CP2 of the first rods 12 with the support sheet 18 attached are immersed in the external electrode paste 21 contained in the pool 22 at a predetermined depth, and then removed from the external electrode paste 21 to be dried. The support sheet 18 is then reattached, and the external electrode paste 21 is applied to the other of the first cut surface CP1 or the second cut surface CP2 (first cut surface CP1 in FIG. 30) of each first rod 12 in the same or similar process as described above. In forming the underlayers 15, the support sheet 17 on which the first rods 12 are fixed may be fixed on the flat plate 28 as illustrated in, for example, FIG. 30. This facilitates the handling of the first rods 12.

The external electrode paste 21 contains an inorganic material, a binder, and a solvent. The inorganic material contains a ceramic dielectric material containing, as a main component, barium titanate being the same as barium titanate contained in the base component and a conductive metal material containing, as a main component, nickel or a nickel alloy being the same as nickel or the nickel alloy contained in the internal electrode layers. The sintering behavior of the underlayers 15 and the base components 2 at high temperatures can thus be similar to each other in the subsequent firing. This allows the ceramic material of the underlayers 15 to be bonded with the dielectric ceramic layers 4 of the base component 2 by sintering and the conductive metal material of the underlayers 15 to be bonded with the internal electrode layers 5 of the base component 2 by sintering, firmly bonding the underlayers 15 to the base component 2.

Figure 31:
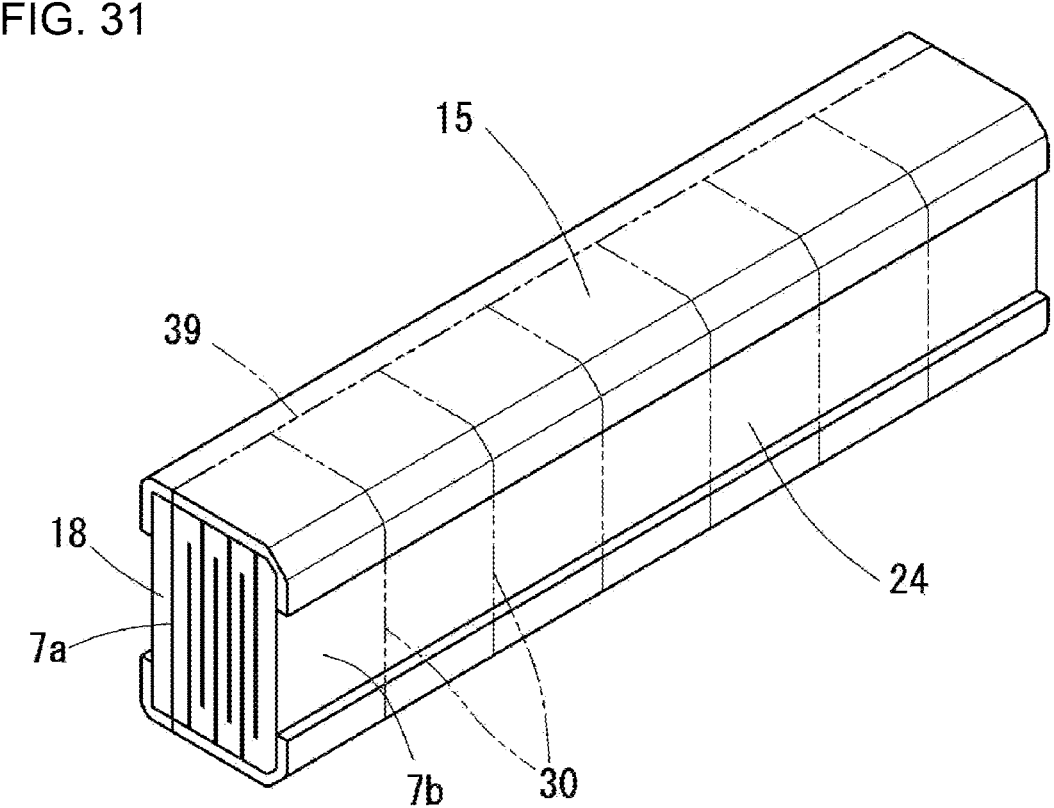
FIG. 31 is a perspective view of a second rod including underlayers formed on a first rod in FIG. 30.
Figure 32:
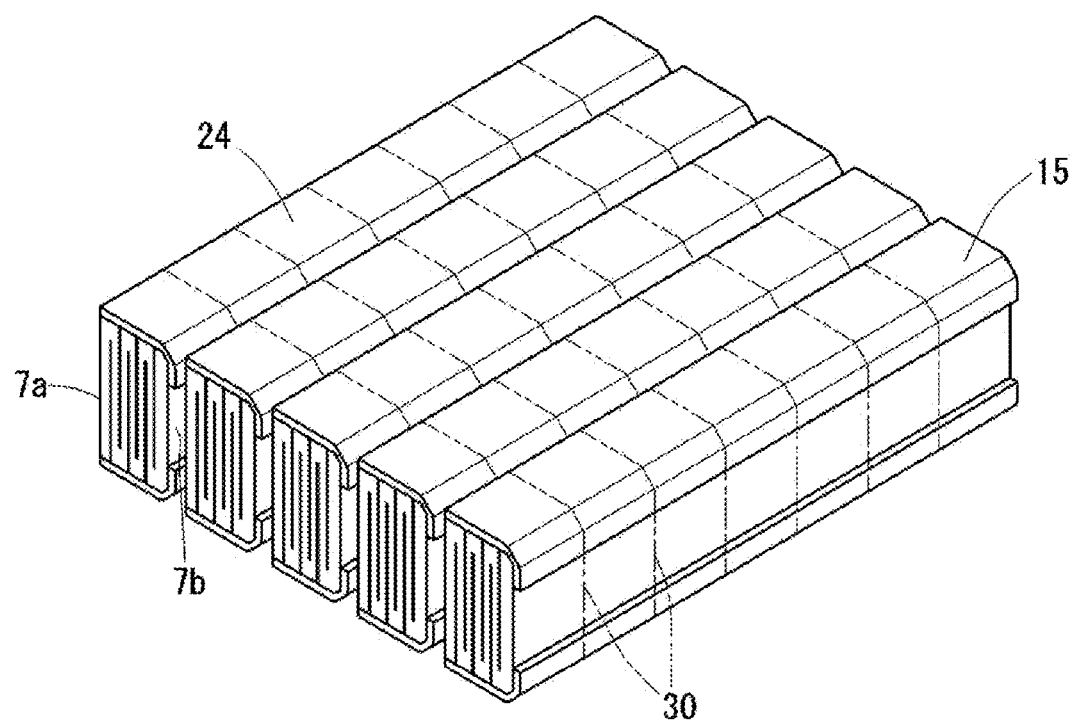
FIG. 32 is a perspective view of second rods with the support sheet peeled off from the state illustrated in FIG. 31.

As illustrated in, for example, FIG. 31, the underlayers 15 are also formed on the support sheet 18 located on the first surface 7a of the second rod 24 (first rod 12 to which the external electrode paste 21 is applied). In the present embodiment, the high-temperature foam releasable sheet or the temperature-sensing adhesive releasable sheet that loses an adhesive force at high temperatures is used as the support sheet 18. When the external electrode paste 21 is dried, the support sheet 18 thus peels off from the second rod 24 along a split line 39 illustrated in FIG. 31. FIG. 32 illustrates multiple second rods 24 with the support sheet 18 peeled off.

Subsequent processes are the same as the processes described with reference to FIG. 17 and the subsequent processes in the above embodiment and will not be described in detail.

The present disclosure may be implemented in the following forms.

In one or more embodiments of the present disclosure, a multilayer ceramic electronic component includes a base component being substantially a rectangular prism, a first external electrode, a second external electrode, and a protective layer. The base component includes a plurality of ceramic layers and a plurality of internal electrode layers with different polarities alternately stacked on one another. The base component includes a first surface and a second surface opposite to each other in a stacking direction of the plurality of ceramic layers and the plurality of internal electrode layers, a first end face and a second end face opposite to each other, and a first side surface and a second side surface opposite to each other. The plurality of internal electrode layers is exposed on the first side surface and on the second side surface. The plurality of internal electrode layers includes internal electrode layers with a first polarity exposed on one of the first end face or the second end face and internal electrode layers with a second polarity exposed on the other of the first end face or the second end face. The first external electrode is connected to the internal electrode layers exposed on the first end face. The second external electrode is connected to the internal electrode layers exposed on the second end face. Each of the first external electrode and the second external electrode extends to at least one of the first surface or the second surface and includes a first terminal side surface flush with the first side surface and a second terminal side surface flush with the second side surface. The protective layer contains a ceramic material. The protective layer covers the first side surface, the second side surface, and the first terminal side surface and the second terminal side surface of each of the first external electrode and the second external electrode.

In one or more embodiments of the present disclosure, a method for manufacturing a multilayer ceramic electronic component includes cutting a multilayer base into a first rod at a predetermined interval. The multilayer base includes a plurality of ceramic green sheets and a plurality of internal electrode layers alternately stacked on one another. The first rod includes a first surface, a second surface, a first cut surface, and a second cut surface. The method includes chamfering edges between the first and second surfaces and the first and second cut surfaces and forming a first external electrode and a second external electrode extending from each of the first cut surface and the second cut surface to at least one of the first surface or the second surface to obtain a second rod. The method includes cutting the second rod at a predetermined interval in a direction orthogonal to a longitudinal direction of the second rod to form a third cut surface and a fourth cut surface on which the plurality of internal electrode layers is exposed and forming a protective layer containing a ceramic material on each of the third cut surface and the fourth cut surface.

In one or more embodiments of the present disclosure, the multilayer ceramic electronic components mounted on a circuit board are less likely to have short-circuiting between the external electrodes of adjacent multilayer ceramic electronic components, and can be mounted on the circuit board highly densely.

In one or more embodiments of the present disclosure, the method for manufacturing the multilayer ceramic electronic component allows manufacturing of the above multilayer electronic component with less manufacturing burden and high productivity.

The uses of the methods, devices, and materials in the embodiments described above are not limited to the manner in the embodiments, and may be combined with one another. For example, the protective layers may be formed by attaching a ceramic green sheet to the rods or the base components, or applying a ceramic slurry to the rods or the base components by immersion. In the embodiments, the material of the protective layers is substantially the same as or similar to the material of the base component, but the materials of the protective layers and the base component may differ when the materials allow firm bonding between the base component and the protective layers. Changing the processing conditions in the embodiments or adding new processes to the embodiments as above does not affect the spirit and scope of the present disclosure.

REFERENCE SIGNS 1, 1A, 1B multilayer ceramic electronic component (multilayer ceramic capacitor)
2 base component
3a first external electrode
3b second external electrode
3c first terminal side surface (terminal side surface)
3d second terminal side surface (terminal side surface)
4 dielectric ceramic layer (ceramic layer)
5 internal electrode layer
5a conductive paste
6 protective layer
7a first surface (main surface)
7b second surface (main surface)
8a first end face (end face)
8b second end face (end face)
9a first side surface (end face)
9b second side surface (side surface)
10 ceramic green sheet
11 multilayer base
12 first rod
13 second base component
14 press-cutting blade
15 underlayer
16 outer layer
17, 18 support sheet
19 groove (V-groove)
20 ceramic paste
21 external electrode paste
22 pool
23 assembly
24 second rod
25 third rod
26 fourth rod
27 third base component
28 flat plate
30 imaginary separation line
31 void
32 separation line
33 thermoplastic resin
34 resin sheet
36 spacer
37 dummy member
39 split line
41 electrode pad
42 circuit board
43 solder spatter
45 metal phase
46 ceramic phase
50 multilayer ceramic capacitor
CP1 first cut surface
CP2 second cut surface
CP3 third cut surface
CP4 fourth cut surface

The invention claimed is:
1. A multilayer ceramic electronic component, comprising:
a base component being substantially a rectangular prism;
a first external electrode;
a second external electrode; and
a protective layer,
the base component including a plurality of ceramic layers and a plurality of internal electrode layers with different polarities alternately stacked on one another, the base component including a first surface and a second surface opposite to each other in a stacking direction of the plurality of ceramic layers and the plurality of internal electrode layers, a first end face and a second end face opposite to each other, and a first side surface and a second side surface opposite to each other, the plurality of internal electrode layers being exposed on the first side surface and on the second side surface, the plurality of internal electrode layers including internal electrode layers with a first polarity exposed on one of the first end face or the second end face and internal electrode layers with a second polarity exposed on the other of the first end face or the second end face, the first external electrode being connected to the internal electrode layers exposed on the first end face, the second external electrode being connected to the internal electrode layers exposed on the second end face, each of the first external electrode and the second external electrode extending to at least one of the first surface or the second surface and including a first terminal side surface flush with the first side surface and a second terminal side surface flush with the second side surface, the protective layer comprising a ceramic material, the protective layer covering the first side surface, the second side surface, and the first terminal side surface and the second terminal side surface of each of the first external electrode and the second external electrode.

2. The multilayer ceramic electronic component according to claim 1, wherein each of the first external electrode and the second external electrode includes an underlayer in contact with the base component, the underlayer comprises a ceramic material and a conductive metal material, the ceramic material of the underlayer contains a component being the same as or similar to a main component of the plurality of ceramic layers or a main component of the protective layer, and the conductive metal material of the underlayer contains a component being the same as or similar to a main component of the plurality of internal electrode layers.

3. The multilayer ceramic electronic component according to claim 2, wherein the underlayer has a ratio of 40:60 to 80:20 between an area of a metallic phase and an area of a ceramic phase in a cross-sectional view.

4. The multilayer ceramic electronic component according to claim 2, wherein the protective layer comprises barium titanate as the main component, and the conductive metal material of the underlayer contains nickel or a nickel alloy as a main component.

5. The multilayer ceramic electronic component according to claim 1, wherein the protective layer extends to the first surface and the second surface of the base component and surfaces of the first external electrode and the second external electrode continuous with the first terminal side surface and the second terminal side surface.

6. The multilayer ceramic electronic component according to claim 1, wherein the base component includes chamfered edges between the first and second surfaces and the first and second end faces.

7. A method for manufacturing a multilayer ceramic electronic component, the method comprising:

cutting a multilayer base into a first rod at a predetermined interval, the multilayer base including a plurality of ceramic green sheets and a plurality of internal electrode layers alternately stacked on one another, the first rod including a first surface, a second surface, a first cut surface, and a second cut surface;

chamfering edges between the first and second surfaces and the first and second cut surfaces, and forming a first external electrode and a second external electrode extending from each of the first cut surface and the second cut surface to at least one of the first surface or the second surface to obtain a second rod;

cutting the second rod at a predetermined interval in a direction orthogonal to a longitudinal direction of the second rod to form a third cut surface and a fourth cut surface on which the plurality of internal electrode layers is exposed; and forming a protective layer comprising a ceramic material on each of the third cut surface and the fourth cut surface.

8. The method according to claim 7, wherein the ceramic material of the protective layer is a single-layer ceramic green sheet or a multilayer ceramic green sheet, and forming the protective layer includes placing the single-layer ceramic green sheet or the multilayer ceramic green sheet into contact with each of the third cut surface and the fourth cut surface, and transferring a portion of the single-layer ceramic green sheet or the multilayer ceramic green sheet in contact with the third cut surface onto the third cut surface and transferring a portion of the single-layer ceramic green sheet or the multilayer ceramic green sheet in contact with the fourth cut surface onto the fourth cut surface.

9. The method according to claim 7, wherein the ceramic material of the protective layer is a ceramic paste, and forming the protective layer includes immersing the third cut surface and the fourth cut surface into the ceramic paste and then removing the third cut surface and the fourth cut surface from the ceramic paste for drying.

10. The method according to claim 7, wherein cutting the second rod includes arranging a plurality of the second rods into an assembly with one of the first cut surface or the second cut surface of each of the plurality of second rods aligned in an imaginary plane, and cutting the plurality of second rods with a dummy member placed adjacent to the assembly.

11. The method according to claim 7, wherein cutting the second rod includes arranging a plurality of the second rods into an assembly with one of the first cut surface or the second cut surface of each of the plurality of second rods aligned in an imaginary plane, and cutting the plurality of second rods after fixing the assembly with a thermoplastic resin.

12. The method according to claim 7, wherein cutting the multilayer base into the first rod includes cutting the multilayer base attached to a support sheet together with the support sheet and forming a first rod with a part of the support sheet attached, and forming the first external electrode and the second external electrode to obtain the second rod includes forming the first external electrode and the second external electrode on the first rod with the part of the support sheet attached, and then peeling off the part of the support sheet from the first rod.

* * * * *